(12) United States Patent
Kishikawa et al.

(10) Patent No.: US 8,227,085 B2
(45) Date of Patent: Jul. 24, 2012

(54) ANTI-FOGGING ARTICLE AND ANTI-FOGGING AGENT COMPOSITION

(75) Inventors: Noriko Kishikawa, Chiyoda-ku (JP); Takashige Yoneda, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/113,297

(22) Filed: May 1, 2008

(65) Prior Publication Data

US 2009/0011244 A1    Jan. 8, 2009

(30) Foreign Application Priority Data

Nov. 1, 2005    (JP) .................................. 2005-318347
Feb. 9, 2006    (JP) .................................. 2006-032573

(51) Int. Cl.
*B32B 17/10* (2006.01)
*B32B 27/38* (2006.01)
*C09K 3/18* (2006.01)
*B32B 15/092* (2006.01)

(52) U.S. Cl. .......... 428/417; 106/13; 428/413; 428/418; 523/169

(58) Field of Classification Search .......... 428/412–418; 106/13; 523/169
See application file for complete search history.

(56) References Cited

U.S. PATENT DOCUMENTS

| | | | | |
|---|---|---|---|---|
| 2,965,610 | A * | 12/1960 | Newey | 528/115 |
| 4,195,138 | A * | 3/1980 | Ward | 525/404 |
| 4,642,266 | A | 2/1987 | Funaki et al. | |
| 4,738,992 | A * | 4/1988 | Larson et al. | 521/157 |
| 4,806,578 | A | 2/1989 | Kobayashi et al. | |
| 4,930,879 | A * | 6/1990 | Iryo et al. | 359/642 |
| 5,236,974 | A * | 8/1993 | Dreischhoff et al. | 523/403 |
| 6,164,785 | A * | 12/2000 | Maekawa | 359/613 |
| 6,287,683 | B1 * | 9/2001 | Itoh et al. | 428/336 |
| 6,342,295 | B1 * | 1/2002 | Kobayashi | 428/323 |
| 2003/0072082 | A1 * | 4/2003 | Cross | 359/581 |
| 2003/0203991 | A1 | 10/2003 | Schottman et al. | |
| 2004/0176501 | A1 * | 9/2004 | Yasuda et al. | 523/402 |

FOREIGN PATENT DOCUMENTS

| | | |
|---|---|---|
| EP | 0 119 331 A1 | 9/1984 |
| JP | 57119973 | 7/1982 |
| JP | 05179233 A * | 7/1993 |
| JP | 2000192021 | 7/2000 |
| JP | 2001-356201 | 12/2001 |
| JP | 2002-53792 | 2/2002 |
| JP | 2002053792 | 2/2002 |
| JP | 2002-161241 | 6/2002 |
| JP | 2003238207 | 8/2003 |
| JP | 2004-269851 | 9/2004 |
| JP | 2004269851 | 9/2004 |

OTHER PUBLICATIONS

Machine translation of JP 05179233 A.*
"Cationic Polymerization of Epoxide by Fluorenylphosphonium Salts as Thermally Latent Initiators. Substituent Effect on the Initiator Activity." Tatsuya Toneri, Fumio Sanda, and, Takeshi Endo. Macromolecules 2001 34 (5), 1518-1521.*
Extended European Search Report issued Jan. 24, 2011 in EP 06 822 817 filed Nov. 1, 2006.

* cited by examiner

*Primary Examiner* — Callie Shosho
*Assistant Examiner* — John Freeman
(74) *Attorney, Agent, or Firm* — Oblon, Spivak, McClelland, Maier & Neustadt, L.L.P.

(57) ABSTRACT

To provide an anti-fogging article having excellent anti-fogging performance and further having excellent durability, and an anti-fogging agent composition. An anti-fogging article comprising a substrate and a water-absorptive crosslinked resin layer formed on the surface of the substrate, wherein the water-absorptive crosslinked resin is a crosslinked resin with a saturated water absorption of at least 45 mg/cm$^3$, or a water-absorptive crosslinked resin with a glass transition point of at least 50° C. as measured by a differential scanning calorimeter and further with a saturated water absorption of at least 45 mg/cm$^3$.

16 Claims, No Drawings

ANTI-FOGGING ARTICLE AND ANTI-FOGGING AGENT COMPOSITION

TECHNICAL FIELD

The present invention relates to a novel anti-fogging article and a novel anti-fogging agent composition.

BACKGROUND ART

A transparent substrate such as glass or plastics, scatters transmitted light since fine water droplets are deposited on the surface of the substrate when the surface has a dew-point temperature or lower, thus leading to impairment in transparency, i.e. a state of "fogging". As a method for preventing the fogging, heretofore, various methods such as the following (1) to (5) have been proposed.
(1) A method of treating the substrate surface with a surfactant to lower the surface tension (for example, Patent Document 1),
(2) a method of treating the substrate surface with a hydrophilic compound so that the substrate surface would be hydrophilic (for example, Patent Documents 2 and 3),
(3) a method of treating the substrate surface with a water-absorptive compound to lower the atmospheric humidity on the substrate surface (for example, Patent Document 4),
(4) a method of warming the substrate by providing e.g. a heater so that the substrate surface would be kept at a temperature higher than the dew-point temperature, and
(5) a method of treating the substrate surface with a water-repellent compound so that no fine water droplets would be deposited on the surface of the substrate.

Further, an effect of preventing the fogging (hereinafter, referred to as "anti-fogging performance") has been required to be maintained over a long period under a working environment. Further, in order to maintain the anti-fogging performance over a long period under various environments, the durability such as abrasive resistance, water resistance, heat resistance, humidity resistance or water-wiping durability is also required.

However, each of the above methods (1) to (5) has difficulties as follows. In the case of the method (1), there is a difficulty in fixing a surfactant on the substrate surface and maintaining the low-surface tension over a long period. In the case of the method (2), e.g. a hydrophilic resin or a hydrophilic inorganic compound is used. However, in either case, especially inorganic soils are likely to be adsorbed and fixed, and it is difficult to maintain the hydrophilicity. In the case of the method (3), e.g. a water-absorptive resin is used. Though the water-absorptive resin is inferior in abrasive resistance or weather resistance to an inorganic compound, such a resin is excellent in an effect of preventing especially the inorganic soils and capable of readily maintaining the anti-fogging performance over a long period as long as the hydrophobic nature is imparted on the surface of the resin. In the case of the method (4), it is possible to maintain the anti-fogging performance semipermanently, but such a method is very expensive since energy accompanied by applying a current is always required. In the case of the method (5), in order to attain the anti-fogging performance, it is required to impart water-repellency to let even extremely fine water droplets with a diameter of at most 1 mm slip down or to prevent them from depositing, but such techniques are currently not present.

Accordingly, the present inventors considered that in order to readily maintain the anti-fogging performance at a low cost, it is possible to employ the method (3) in which a water-absorptive resin is used. As for the method in which a water-absorptive resin is used, an anti-fogging film and a coating agent to form a urethane resin having a surfactant, trialkanolamine and the like fixed, have been disclosed in order to obtain both anti-fogging performance and abrasive resistance (Patent Document 5).

In addition, Patent Document 6 discloses that it is possible to obtain a surface-coating composition for anti-fogging by reacting γ-aminopropyl trimethoxy silane and bisphenol A diglycidyl ether.
Patent Document 1: JP-A-2003-238207
Patent Document 2: JP-A-2001-356201
Patent Document 3: JP-A-2000-192021
Patent Document 4: JP-A-2002-53792
Patent Document 5: JP-A-2004-269851
Patent Document 6: JP-A-2002-161241

DISCLOSURE OF THE INVENTION

Problems to be Solved by the Invention

However, in the case of the anti-fogging resin film disclosed in Patent Document 5, there was a problem that it is difficult to maintain excellent anti-fogging performance over a long period of time.

Further, the present inventors prepared a surface-coating composition for anti-fogging in accordance with Examples in Patent Document 6, and then prepared and evaluated an anti-fogging glass using such a composition, whereby the anti-fogging performance or the durability was found to be insufficient.

It is an object of the present invention to obtain an anti-fogging article showing excellent anti-fogging property and further having excellent durability, and an anti-fogging agent composition for obtaining the anti-fogging property.

Means to Solve the Problems

The present invention has been made to solve the above problems and provides the following.
(1) An anti-fogging article comprising a substrate and a water-absorptive crosslinked resin layer formed on the surface of the substrate, wherein the water-absorptive crosslinked resin is a crosslinked resin with a saturated water absorption of at least 45 mg/cm$^3$.
(2) An anti-fogging article comprising a substrate and a water-absorptive crosslinked resin layer formed on the surface of the substrate, wherein the water-absorptive crosslinked resin is a crosslinked resin with a water contact angle of its surface being at least 30° and further with a saturated water absorption of at least 45 mg/cm$^3$.
(3) An anti-fogging article comprising a substrate and a water-absorptive crosslinked resin layer formed on the surface of the substrate, wherein the water-absorptive crosslinked resin is a crosslinked resin with a glass transition point of at least 50° C. as measured by a differential scanning calorimeter and further with a saturated water absorption of at least 45 mg/cm$^3$.
(4) An anti-fogging article comprising a substrate and a water-absorptive crosslinked resin layer formed on the surface of the substrate, wherein the water-absorptive crosslinked resin is a crosslinked resin with a water contact angle of its surface being at least 30° (a value measured after contact with water droplets for two minutes) and further with a saturated water absorption of at least 60 mg/cm$^3$.
(5) The anti-fogging article according to any one of the above (1) to (4), wherein the water-absorptive crosslinked resin layer is a resin layer formed by reacting a cross-linkable component and a curing agent on the surface of the substrate.
(6) The anti-fogging article according to any one of the above (1) to (5), wherein the crosslinked resin layer is a resin layer formed by applying a liquid composition containing a cross-linkable component, a curing agent and a solvent on the surface of the substrate, followed by drying and reacting.
(7) An anti-fogging article comprising a substrate and a water-absorptive crosslinked resin layer with a saturated water absorption of at least 45 mg/cm$^3$ formed on the surface of the substrate, wherein the above water-absorptive crosslinked resin is a resin obtainable by reacting a polyepoxide and a curing agent.
(8) The anti-fogging article according to the above (7), wherein the above polyepoxide is a polyglycidyl ether compound.
(9) The anti-fogging article according to the above (8), wherein the polyglycidyl ether compound is at least one member selected from the group consisting of glycerol polyglycidyl ether, diglycerol polyglycidyl ether, polyglycerol polyglycidyl ether and sorbitol polyglycidyl ether.
(10) The anti-fogging article according to any one of the above (7) to (9), wherein the water-absorptive crosslinked resin layer is a resin layer formed by applying a liquid composition containing a polyepoxide, a curing agent and a solvent on the surface of the substrate, followed by drying and reacting.
(11) The anti-fogging article according to the above (1) to (10), which further contains a hydrophobic layer on the surface of the crosslinked resin layer.
(12) An anti-fogging agent composition comprising a polyepoxide, a curing agent and a solvent, which is a liquid composition for forming an anti-fogging crosslinked resin layer on the surface of a substrate by applying the liquid composition on the surface of the substrate, followed by drying and reacting to obtain the anti-fogging article as defined in the above (1) to (11).
(13) The anti-fogging agent composition according to the above (12), which further contains a filler.
(14) The anti-fogging agent composition according to the above (12) or (13), which further contains a silicone leveling agent.
(15) The anti-fogging agent composition according to any one of the above (12) to (14), which further contains a coupling agent.

Effects of the Invention

The anti-fogging article of the present invention has excellent anti-fogging performance, and the durability such as abrasive resistance, water resistance, or humidity resistance, and it is possible to maintain the excellent anti-fogging performance over a long period under various environments, particularly even under a high-temperature and high-humidity environment.

BEST MODE FOR CARRYING OUT THE INVENTION

The anti-fogging article of the present invention has a substrate and a water-absorptive crosslinked resin layer formed on the surface of the substrate.

The substrate is preferably a substrate made of glass, plastic, metal, ceramics or a combination thereof (e.g. a composite material or a laminated material), particularly preferably a transparent substrate made of glass or plastic.

The substrate may have a plate-shape or have a curvature on the entire surface or a part thereof. The thickness of the substrate is properly selected depending upon the particular use of the anti-fogging article, and is usually preferably from 1 to 10 mm.

Further, it is preferred that the substrate has reactive groups on the surface. The reactive groups are preferably hydrophilic groups, and the hydrophilic groups are preferably hydroxyl groups. Further, e.g. oxygen plasma treatment, corona discharge treatment or ozone treatment may be applied to the substrate to decompose and remove an organic material deposited on the surface, or a fine convexoconcave structure may be formed on a surface to make the surface hydrophilic. Further, glass or a metal oxide usually has hydroxide groups on the surface.

Further, for the purpose of e.g. increasing the adhesion between the substrate and the crosslinked resin layer, a thin film of a metal oxide such as silica, alumina, titania or zirconia, or a thin film of an organic group-containing metal oxide, may be formed on the substrate surface. The thin film of a metal oxide may be formed from a metal compound with a hydrolysable group by means of a sol-gel method. Such a metal compound is preferably e.g. tetraalkoxysilane or its oligomer, or tetraisocyanate silane or its oligomer. The thin film of an organic group-containing metal oxide is a thin film obtainable by treating the substrate surface with an organic metal coupling agent. As the organic metal coupling agent, a silane coupling agent, a titanium coupling agent or an aluminum coupling agent may be used, and a silane coupling agent is particularly preferred. Further, a coupling agent for preliminarily treating the substrate surface is hereinafter referred to as 'a coupling agent for surface treatment'.

The water-absorptive crosslinked resin layer in the present invention is made of a water-absorptive crosslinked resin formed on the above substrate. The crosslinked resin is a crosslinked resin with a saturated water absorption of at least 45 mg/cm$^3$, and has a sufficient water absorbing power for developing the anti-fogging performance. The saturated water absorption is preferably at least 60 mg/cm$^3$. Further, the saturated water absorption is particularly preferably from 75 to 185 mg/cm$^3$, most preferably from 90 to 155 mg/cm$^3$ from the viewpoint that it is possible to develop both of the anti-fogging performance and the durability (e.g. abrasive resistance, water resistance, heat resistance, humidity resistance or water-wiping durability).

The saturated water absorption is a value calculated by the following procedure. An anti-fogging article is left to stand for one hour in an environment at room temperature under a relative humidity of 50%, then the surface of the water-absorptive crosslinked resin layer is exposed to warm water vapor of 40° C., and immediately after the fogging or distortion due to a water film occurs on the surface of the crosslinked resin layer, the moisture amount (A) in the entire anti-fogging article is measured by using a micro-moisture analyzer. Separately, the moisture amount (B) of the substrate itself having no water-absorptive crosslinked resin layer formed, is measured by the same procedure, and the saturated water absorption was obtained from a value calculated by dividing the value obtained by subtracting the moisture amount (B) from the moisture amount (A), by the volume of the crosslinked resin.

In the measurement of the moisture amount to be obtained by using the micro-moisture analyzer, a test sample was heated at 120° C., moisture discharged from the sample was adsorbed by molecular sieves in the micro-moisture analyzer, and the weight change in the molecular sieves was regarded as the moisture amount. Here, the time when the weight change per minute becomes at most 0.02 mg, is regarded as the end point.

Such a water-absorptive crosslinked resin has a saturated water absorption of at least 45 mg/cm$^3$ (preferably at least 60 mg/cm$^3$), and further has a water contact angle of its surface being preferably at least 30°. Since the crosslinked resin has the above saturated water absorption, it originally has a sufficient water absorbing power for developing the anti-fogging performance. Further, even when the water absorption increases and the crosslinked resin layer absorbs water in an amount exceeding the critical amount of the saturated water absorption thereof, it is possible to prevent a water film from forming on the surface of the crosslinked resin layer since the water contact angle is at least 30°, and it is possible to suitably maintain the anti-fogging performance.

When water droplets are deposited on the surface of the crosslinked resin layer, it is possible to suppress the formation of a water film if the water contact angle is at least 30°. In a case where the anti-fogging article of the present invention is used as a window glass for transport equipments such as vehicles, if a water film is formed on the surface of the window glass, perspective distortion will occur, thus leading to poor visibility or hindrance in driving. In the present invention, when the water contact angle is at least 30°, it is possible to suppress forming of the water film.

Further, if water droplets are in contact with the surface of the substrate, the surface will be wet with passage of time, whereby the contact angle of water droplets on the substrate surface tends to be small. However, the contact angle of the anti-fogging article of the present invention may be kept to at least 300 even after contact with water droplets for two minutes, and therefore the water film is unlikely to be formed.

Further, when the water contact angle of its surface is at least 30°, there is also an advantage that the water resistance is readily obtainable and inorganic soils are less likely to be adsorbed and fixed.

The upper limit of the water contact angle is not particularly limited, but is usually approximately 100° in consideration of materials of the crosslinked resin to be used for the anti-fogging article of the present invention.

Here, the value of the water contact angle is obtained in such a manner that the anti-fogging article is left to stand for one hour in an environment at room temperature under a relative humidity of 50%, and then 1 μL of water is put on the surface of a water-absorptive crosslinked resin layer, followed by measuring the value immediately or after two minutes from putting 1 μL of water.

Further, the water-absorptive crosslinked resin in the present invention is a resin having a glass transition point as measured by a differential scanning calorimetry (hereinafter referred to as 'glass transition point') of at least 50° C. and further having a saturated water absorption of at least 45 mg/cm$^3$.

The glass transition point is a value measured in accordance with JIS K7121. Specifically, such a value is obtained in such a manner that a crosslinked resin is obtained under the same conditions (conditions for forming a crosslinked resin on a substrate) as in preparation of the after-mentioned anti-fogging article, and the resin is left to stand for 1 hour in an environment at 20° C. under a relative humidity of 50%, followed by measuring the value by a differential scanning calorimetry, provided that the heating rate is 10° C./min.

In the present invention, the crosslinked resin is a nonlinear polymer having a three-dimensional network, and it is preferred to have a three-dimensional network crosslinked with a monomer, an oligomer or a polymer having at least two crosslinkable groups.

In order that the crosslinked resin has good durability, the glass transition point thereof is at least 50° C., preferably at least 90° C. In order to obtain the good durability, it is important to have a dense three-dimensional network with many crosslinked sites in the crosslinked resin. The glass transition point of a resin closely relates to the number of crosslinked sites in the resin, and it is usually considered that a resin having a high glass transition point has a large number of crosslinked sites contained per unit amount. Accordingly, in order to increase the durability of the crosslinked resin, it is preferred that the crosslinked resin has a higher glass transition point.

On the other hand, in order to obtain good anti-fogging performance, it is important to have an appropriate size of spaces for water retention to control water absorption properties. It is considered that as the number of the crosslinking sites contained per unit amount becomes large, the spaces for water retention become small, and the water absorption performance becomes small. Accordingly, in order to obtain the good anti-fogging performance, it is necessary that the resin has a glass transition point in a specific appropriate range.

It is preferred that the crosslinked resin has both of the anti-fogging performance and the durability at a high level. From the viewpoint of such an aspect, the upper limit of the glass transition point of the crosslinked resin is usually 250° C., preferably 200° C., depending upon the type of the crosslinked resin. The range of the glass transition point is preferably from 50 to 200° C., particularly preferably from 90 to 150° C.

With a water-absorptive crosslinked resin, it is possible to achieve the good anti-fogging performance by satisfying the above saturated water absorption, and in addition, it is possible to achieve both of the anti-fogging properties and the durability by satisfying the conditions of the glass transition point and the water contact angle, such being preferred.

Such a water-absorptive crosslinked resin is not particularly limited, but for example, among the resins as shown below, it is possible to use a resin satisfying the conditions of the above glass transition point and saturated water absorption.

A starch resin such as a composite of e.g. a hydrolyzate of a starch-acrylonitrile graft polymer or a starch-acrylic acid graft polymer; a cellulose resin such as a cellulose-acrylonitrile graft polymer or carboxymethyl cellulose; a polyvinyl alcohol resin such as a polyvinyl alcohol crosslinked polymer; an acryl resin such as a sodium polyacrylate crosslinked product or a polyacrylate crosslinked product; a polyether resin such as a polyethylene glycol-diacrylate crosslinked polymer or a polyalkylene oxide-polycarboxylic acid crosslinked product; a crosslinked polyurethane which is a reaction product of polyisocyanate with polyether polyol or polyester polyol, and so on.

Further, the water-absorptive crosslinked resin in the present invention preferably has a change in the haze value of at most 20% as between before and after its abrasive resistance test conducted in accordance with JIS R3212.

A method for forming a water-absorptive crosslinked resin layer on the substrate surface may, for example, be (1) a method of reacting a crosslinkable component with a curing agent on the substrate surface, (2) a method of forming a crosslinkable component into a film, and bonding the substrate surface and the film by using a curing agent, or (3) a method of forming a water-absorptive crosslinked resin into a film, and laminating the film with a substrate. Among such methods, the method (1) or (2) is preferred, and the method (1) is particularly preferred since it is possible to maintain good appearance in a case of forming the crosslinked resin layer on the substrate surface with a large area or at a time of industrial mass production. Specifically, it is preferred that the crosslinked resin layer is formed on the substrate surface by applying a composition (hereinafter referred to also as a coating composition) containing a crosslinkable component and a curing agent as essential components on the surface of the substrate, followed by drying and reacting.

The composition containing the crosslinkable component and the curing agent as essential components preferably contains a solvent for improving coating workability. Accordingly, the method for forming a water-absorptive crosslinked resin layer on the substrate surface is particularly preferably a method of applying a liquid composition containing a crosslinkable component, a curing agent and a solvent on the substrate surface, followed by drying and reacting. Further, it is also preferred to employ a method of coating the substrate is surface with a liquid composition obtainable by reacting a crosslinkable component with a curing agent in a solvent, followed by drying and further reacting the liquid composition with the substrate surface.

Further, it is also preferred that the coating composition contains a coupling agent for improving the adhesion between the substrate surface and the crosslinked resin.

The crosslinkable component in the present invention is a monomer, an oligomer or a polymer having crosslinkable groups, and is not particularly limited so long as it can be formed into a crosslinked resin by a reaction in the presence of the after-mentioned curing agent. The crosslinkable group may, for example, be a vinyl group, an epoxy group, a styryl group, an acryloyloxy group, a methacryloyloxy group, an amino group, an ureido group, a chloro group, a thiol group, a sulfide group, a hydroxyl group, a carboxyl group or an acid anhydride group, preferably a carboxyl group, an epoxy group or a hydroxyl group, and particularly preferably an epoxy group. The number of such crosslinkable groups in the crosslinkable component is not particularly limited so long as it is possible to satisfy the anti-fogging performance and the durability required in the present invention. Further, such crosslinkable components may be used alone or in combination as a mixture of two or more of them.

In a case where the crosslinkable component is a monomer or an oligomer having crosslinkable groups, the number of crosslinkable groups contained per molecule is preferably at least two, particularly preferably from 2 to 10. In some cases, the component having one crosslinkable group may be used, and the amount thereof is preferably such that the number of average crosslinkable groups per molecule in the crosslinkable component is at least 1.5.

When the crosslinkable component is a monomer or an oligomer, such a component is preferably a polyepoxide. The polyepoxide is a component with epoxy groups as crosslinkable groups, which is to be formed into a crosslinked resin by a reaction with a curing agent. The average number of epoxy groups in the polyepoxide is at least 2, preferably from 2 to 10.

Such a polyepoxide is preferably a polyglycidyl compound such as a polyglycidyl ether compound, a polyglycidyl ester compound or a polyglycidyl amine compound. Further, the polyepoxide may be any one of an aliphatic polyepoxide and an aromatic polyepoxide, and preferably an aliphatic polyepoxide. Such a polyepoxide is a compound having at least two epoxy groups.

Among them, a polyglycidyl ether compound is preferred, and particularly preferably an aliphatic polyglycidyl ether compound. The polyglycidyl ether compound is preferably a glycidyl ether of at least bifunctional alcohol, and particularly preferably a glycidyl ether of at least trifunctional alcohol since the durability and the anti-fogging performance becomes good. Further, such an alcohol is preferably an aliphatic alcohol, an alicyclic alcohol or a sugar alcohol.

Specifically, ethylene glycol diglycidyl ether, polyethylene glycol diglycidyl ether, propylene glycol diglycidyl ether, polypropylene glycol diglycidyl ether, neopentyl glycol diglycidyl ether, glycerol polyglycidyl ether, diglycerol polyglycidyl ether, polyglycerol polyglycidyl ether, trimethylolpropane polyglycidyl ether, sorbitol polyglycidyl ether or pentaerythritol polyglycidyl ether may, for example, be mentioned. They may be used alone or in combination as a mixture of two or more of them.

Among them, it is preferred to use a polyglycidyl ether (one having more than two glycidyl groups, or average, per molecule) of an aliphatic polyol having at least three hydroxyl groups, such as glycerol polyglycidyl ether, diglycerol polyglycidyl ether, polyglycerol polyglycidyl ether or sorbitol polyglycidyl ether, since it is thereby possible to obtain a crosslinked resin particularly excellent in anti-fogging performance.

In a case where a crosslinkable component is a polymer having crosslinkable groups, it is not particularly limited so long as it can be formed into a crosslinked resin by reacting it with an after-mentioned curing agent. The polymer having crosslinkable groups is preferably a linear polymer. Such a crosslinkable group may, for example, be a group having the same crosslinkability as in the above monomer and oligomer, and a carboxyl group, an epoxy group or a hydroxyl group is preferred. The number of crosslinkable groups in the polymer as a crosslinkable component, is not particularly limited so long as it is possible to satisfy the anti-fogging performance and durability required in the present invention, and usually it is preferably from 0.1 to 2.0 mmol, particularly preferably from 0.5 to 1.5 mmol per 1 g of the polymer as a crosslinkable component. Further, a molecular weight of the polymer is preferably from 500 to 50,000, particularly preferably from 2,000 to 20,000.

As a polymer having such crosslinkable groups, a vinyl polymer (hereinafter referred to as a crosslinkable vinyl polymer) having the crosslinkable groups as mentioned above is preferred. The crosslinkable vinyl polymer in the present invention is a polymer having a main chain formed by polymerizing a monomer with a polymerizable site containing a carbon-carbon double bond. The crosslinkable vinyl polymer is preferably a linear polymer. Further, it is preferred that the crosslinkable vinyl polymer has a hydrophilic group or a hydrophilic polymer chain since it is thereby possible to obtain a crosslinked resin having high water absorption property. As the case requires, the curing agent may be used to impart the water absorption property to the crosslinked resin. The crosslinkable vinyl polymer is preferably a crosslinkable vinyl polymer having a cationic group and a crosslinkable group.

The cationic group is preferably a group having a quaternary ammonium structure. The crosslinkable group is not particularly limited so long as it undergoes reaction with a reactive group in the curing agent and is a group capable of forming a three dimensional network structure. The crosslinkable group may be the above crosslinkable group, preferably a carboxyl group, an epoxy group or a hydroxyl group, particularly preferably a carboxyl group.

The molecular weight of the crosslinkable vinyl polymer is not particularly limited, but is preferably from 500 to 50,000, particularly preferably from 1,000 to 20,000 as a number average molecular weight. If the molecular weight is less than 500, the anti-fogging performance tends to be deteriorated. Further, if the molecular weight exceeds 50,000, the adhesion between a substrate and a crosslinked resin tends to be deteriorated.

The proportion of cationic groups in the crosslinkable vinyl polymer is from 0.1 to 2.0 mmol, preferably from 0.4 to 2.0 mmol, particularly preferably from 0.5 to 1.5 mmol per 1 g of the polymer. Further, the proportion of crosslinkable groups is preferably from 1.0 to 3.0 mmol, particularly preferably from 1.5 to 2.5 mmol per 1 g of the polymer.

The above crosslinkable vinyl polymer contains monomer units having a cationic group and monomer units having a crosslinkable group. Usually, other monomer units other than the above monomer units are further incorporated therein. Such other monomer units are usually used for adjusting the amount of cationic groups and crosslinkable groups in the crosslinkable vinyl polymer, and adjusting physical characteristics or chemical characteristics of the crosslinkable vinyl polymer or a crosslinked resin having such a polymer crosslinked. As a monomer for bringing such other monomer units into the crosslinkable vinyl polymer, it is possible to selectively use various ones depending upon the purpose. An olefin monomer, an aromatic vinyl monomer, a halogenated vinyl monomer, a cyanide vinyl monomer, an unsaturated carboxylate monomer, a vinyl ester monomer or a vinyl ether monomer may, for example, be mentioned.

Further, such a monomer unit in the crosslinkable vinyl polymer means a unit formed by polymerization of the monomer, and a specific monomer unit is referred to as "a monomer unit of (name of a monomer)", or simply referred to as "(name of a specific monomer) unit". Further, the monomer unit means a monomer unit (of which the chemical structure other than the site of an unsaturated double bond is the same as the monomer) formed directly by polymerization of the monomer, but in the present invention, even when a monomer unit site is chemically changed at the time of chemically converting a polymer after polymerization, a unit which was the monomer unit site before the chemical conversion also means a monomer unit. Further, an original monomer which brings about monomer units will be simply referred to as "a monomer for monomer units".

The crosslinkable vinyl polymer is preferably a crosslinkable vinyl polymer containing, together with monomer units having a cationic group, monomer units having a carboxyl group as a crosslinkable group, and monomer units having a hydrocarbon group as such other monomer units. Namely, it is preferred to use a crosslinkable vinyl polymer containing monomer units having a cationic group, monomer units having a hydrocarbon group and monomer units having a carboxyl group. At least two types of the respective monomer units may be contained therein, and further monomer units other than them may be contained therein. The monomer units having a cationic group are preferably monomer units having with a quaternary ammonium structure, and as the monomer units having a hydrocarbon group are preferably monomer units having a hydrocarbon group such as an alkyl group, an alkenyl group, a cycloalkyl group, an aryl group or an arylalkyl group. A monomer for such monomer units having a hydrocarbon group may, for example, be a monomer having a hydrocarbon ester group, a monomer having a hydrocarbon ether group (e.g. an alkyl vinyl ether), or a polymerizable unsaturated hydrocarbon such as propylene, butylene, butadiene or styrene, and is preferably a monomer having a hydrocarbon ester group. As a monomer for such monomer units having a carboxyl group, an unsaturated carboxylic acid, an unsaturated polycarboxylic acid or an acid anhydride thereof may be mentioned.

The respective monomer units may be monomer units derived from a monomer having the above group. Otherwise, they may be monomer units formed by converting monomer units formed from a monomer having no such group as mentioned above, to monomer units having the above group by means of chemical conversion after a polymer is formed. For example, it is possible to obtain monomer units having a carboxyl group in such a manner that a polymer is formed from an unsaturated carboxylic acid ester as a monomer, and then its monomer units are hydrolyzed. Similarly, it is possible to obtain monomer units having an alkyl group (one type of a hydrocarbon group) in such a manner that a polymer is formed from an unsaturated carboxylic acid as a monomer, and then a carboxyl group in monomer units thereof is subjected to an alkyl esterification.

Further, such a monomer unit having a cationic group is preferably a monomer unit (U1) of an unsaturated carboxylate monomer having a cationic group. Such a monomer unit having a hydrocarbon group is preferably a monomer unit (U2) of an unsaturated carboxylate monomer having a hydrocarbon group. Such a monomer unit having a carboxylic acid group is preferably a monomer unit (U3) of an unsaturated carboxylic acid monomer.

Monomers for the respective monomer units (U1), (U2) and (U3) will be referred to as monomers (M1), (M2) and (M3), respectively. The unsaturated carboxylic acid as the monomer (M3) is preferably an unsaturated aliphatic carboxylic acid, particularly preferably acrylic acid or methacrylic acid. The unsaturated carboxylic acid ester as the monomer (M1) or (M2) is preferably an unsaturated aliphatic carboxylic acid ester, particularly preferably an acrylate or a methacrylate.

The content of the monomer unit (U1) in the crosslinkable vinyl polymer is preferably at least 5 mol %, particularly preferably from 15 to 50 mol %, based on the total monomer units constituting the crosslinkable vinyl polymer. The content of the monomer unit (U2) is preferably at least 10 mol %, particularly preferably from 20 to 80 mol %, based on the total monomer units. The content of the monomer unit (U3) is preferably from 1 to 20 mol %, particularly preferably from 10 to 20 mol %, based on the total monomer units.

It is possible to obtain the crosslinkable vinyl polymer by copolymerizing a monomer mixture containing the monomers (M1), (M2) and (M3). Such a copolymer may be either a block copolymer or a random copolymer. It is preferred that the polymerization reaction for obtaining a crosslinkable vinyl polymer is carried out by thermal polymerization. When the thermal polymerization is carried out, it is preferred to use a polymerization catalyst such as azobisisobutylonitrile.

The monomer unit (U1) is preferably a monomer unit of a monomer represented by the following formula (1). Namely, the monomer (M1) is preferably the monomer represented by the following formula (1):

$$CH_2=CR^1-COO-(CH_2)_m-N^+R^2R^3R^4X^- \quad (1)$$

In the formula (1), $R^1$ is a hydrogen atom or a methyl group, and is preferably a methyl group, since it is effective for improving the water resistance of a water-absorptive crosslinked resin obtainable.

$R^2$, $R^3$ and $R^4$ are each independently a hydrogen atom or a $C_{1-9}$ alkyl group which may have a substituent group. When $R^2$, $R^3$ and $R^4$ are the latter group, they may have a linear structure or a branched structure, preferably a linear structure. Further, they are preferably a non-substituted group. In a case where they have a substituent group, such a substituent group is preferably an alkoxy group, an aryl group or a halogen atom. The alkoxy group is preferably a methoxy group or an ethoxy group. The aryl group is preferably a phenyl group. The halogen atom is preferably a fluorine atom or a chlorine atom. Further, "$C_{1-9}$" means that the number of carbon atoms in the alkyl group moiety other than the substituent group moiety is from 1 to 9.

It is preferred that $R^2$, $R^3$ and $R^4$ are each independently a hydrogen atom, a methyl group or an ethyl group. Further, such groups may be the same or different. It is preferred that all of $R^2$, $R^3$ and $R^4$ are methyl groups, or one of them is a hydrogen atom and the other two are methyl groups.

$X^-$ is a monovalent anion, and $F^-$, $Cl^-$, $Br^-$, $I^-$ or $p\text{-}CH_3C_6H_4SO_3^-$ may be mentioned, but it is preferably $F^-$ or $Cl^-$, since it is possible to secure a space for maintaining water in the internal portion of the crosslinked resin layer, which controls the water absorption property.

m is an integer of from 1 to 10, preferably from 2 to 5, since both of the anti-fogging performance and the durability are readily attainable.

As the monomer (M1), the following monomers are preferred.

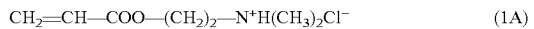

$$CH_2\!=\!CH\!-\!COO\!-\!(CH_2)_2\!-\!N^+H(CH_3)_2Cl^- \quad (1A)$$

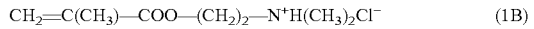

$$CH_2\!=\!C(CH_3)\!-\!COO\!-\!(CH_2)_2\!-\!N^+H(CH_3)_2Cl^- \quad (1B)$$

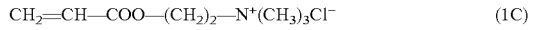

$$CH_2\!=\!CH\!-\!COO\!-\!(CH_2)_2\!-\!N^+(CH_3)_3Cl^- \quad (1C)$$

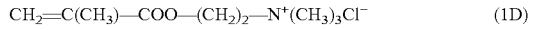

$$CH_2\!=\!C(CH_3)\!-\!COO\!-\!(CH_2)_2\!-\!N^+(CH_3)_3Cl^- \quad (1D)$$

The monomer unit (U2) is preferably a monomer unit of a monomer represented by the following formula (2). Namely, the monomer (M2) is preferably the monomer represented by the following formula (2):

$$CH_2\!=\!CR^5\!-\!COOR^7 \quad (2)$$

wherein the symbols in the formula have the following meanings.

$R^5$: a hydrogen atom or a methyl group,
$R^7$: a $C_{1-30}$ alkyl group, a $C_{2-8}$ alkoxyalkyl group, an aryl group or an arylalkyl group.

$R^5$ is preferably a methyl group, since it is effective for improving the water resistance of a water-absorptive crosslinked resin obtainable. When $R^7$ is a $C_{1-30}$ alkyl group, $R^7$ may have a linear structure or a branched structure, preferably a linear structure. The $C_{1-30}$ alkyl group is preferably a $C_{1-20}$ alkyl group, particularly preferably a $C_{1-10}$ alkyl group, and most preferably a methyl group, an ethyl group or a propyl group. When $R^7$ is a $C_{2-8}$ alkoxyalkyl group, the number of carbon atoms in the alkyl group moiety is from 1 to 4, and the number of carbon atoms in the alkoxy group moiety to be substituted with the alkyl group, is preferably from 1 to 4. When $R^7$ is a $C_{2-8}$ alkoxyalkyl group, a methoxymethyl group, an ethoxymethyl group, a propoxymethyl group, a methoxyethyl group, an ethoxyethyl group or a methoxypropyl group may preferably be used.

When $R^7$ is an aryl group, a phenyl group or a tolyl group is preferred. When $R^7$ is an arylalkyl group, a benzyl group is preferred.

As the monomer (M2), the following monomers are preferred.

$$CH_2\!=\!CH_2\!-\!COOCH_3 \quad (2A)$$

$$CH_2\!=\!C(CH_3)\!-\!COOCH_3 \quad (2B)$$

$$CH_2\!=\!CH\!-\!COO\!-\!(CH_2)_2\!-\!OCH_3 \quad (2C)$$

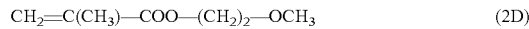

$$CH_2\!=\!C(CH_3)\!-\!COO\!-\!(CH_2)_2\!-\!OCH_3 \quad (2D)$$

The monomer unit (U3) may be a monomer unit of a monomer represented by the following formula (3):

$$CH_2\!=\!CR^8\!-\!COOH \quad (3)$$

wherein $R^8$ represents a hydrogen atom or a methyl group, preferably a hydrogen atom. When $R^8$ is a hydrogen atom, a polymerization reaction for obtaining a crosslinkable vinyl polymer will readily proceed, and the yield by the polymerization reaction is excellent. Namely, it is considered that the steric hindrance would thereby be small at the site involved in the polymerization reaction.

As the monomer (M3), it is also possible to use an unsaturated dicarboxylic acid or an unsaturated dicarboxylic acid anhydride other than the monomer represented by the above formula (3). The unsaturated dicarboxylic acid may, for example, be maleic acid or fumaric acid. The unsaturated dicarboxylic acid anhydride may, for example, be maleic anhydride. The monomer (M3) is preferably the monomer represented by the formula (3).

The crosslinked resin of the present invention is formed by applying a crosslinkable component and a curing agent on the substrate surface, followed by drying and reacting them. Here, the reaction is not particularly limited so long as it is thereby possible to form a crosslinked resin having a three dimensional network structure, and radical polymerization, ion polymerization, polycondensation reaction or polyaddition reaction may, for example, be mentioned. For example, in a case of using a polyepoxide as a crosslinkable component, it is preferred to carry out ion polymerization or polyaddition reaction. By using an optimum curing agent for each reaction, it is possible to form a rigid crosslinked resin layer on the substrate surface.

The curing agent to be suitably used in the present invention is any one of the following:

curing agent (A): a compound having at least two reactive groups capable of reacting with crosslinkable groups in a crosslinkable component, which is a compound to form a crosslinked resin with a three dimensional network structure by its reaction with the crosslinkable component, and curing agent (B): a compound to accelerate formation of a crosslinked resin with a three dimensional network structure by catalyzing a crosslinking reaction of the crosslinkable component.

Now, the respective curing agents will be explained.

Depending upon the type of a crosslinkable group in the crosslinkable component to be combined with the curing agent (A), the reactive group in the curing agent (A) is selected from reactive groups capable of reacting with the crosslinkable group. The reactive group may, for example, be a vinyl group, an epoxy group, a styryl group, an acryloyloxy group, a methacryloyloxy group, an amino group, a ureido group, a chloropropyl group, a mercapto group, a sulfide group, an isocyanate group, a hydroxyl group, a carboxyl group or an acid anhydride group. For example, when the crosslinkable group in the crosslinkable component is a carboxyl group, an epoxy group or an amino group is preferred, and an epoxy group is particularly preferred. When the crosslinkable group is a hydroxyl group, an epoxy group or an isocyanate group is preferred. When the crosslinkable group is an epoxy group, a carboxyl group, an amino group, an acid anhydride group or a hydroxyl group is preferred. Further, the number of reactive groups per molecule of the curing agent (A) is, on average, at least 1.5, preferably from 2 to 8. When the number of reactive groups is within the above range, it is possible to obtain a water-absorptive crosslinked resin excellent in a balance between the anti-fogging performance and the abrasive resistance.

The curing agents (A) may be used in combination as a mixture of two or more of them. For example, it is possible to use a primary curing agent (A) in combination with a second curing agent (A). Such a second curing agent (A) may be a compound having not only a reactive group (which may be the same or different from the reactive group in the primary curing agent (A)) to be reacted with a crosslinkable group in the crosslinkable component, but also a reactive group to be reacted with a reactive group in the primary curing agent (A). The second curing agent (A) to be reacted with the primary curing agent (A) is bonded to a crosslinkable component via the primary curing agent (A). By using such a second curing agent (A) in combination, it is possible to accelerate the forming of a crosslinked resin obtained from the crosslinkable component and the primary curing agent (A).

For example, in the combination of the crosslinkable component having an epoxy group and the curing agent (A) having an amino group, by further using the second curing agent (A) having a hydroxyl group or the second curing agent (A) having an acid anhydride group in combination, it is possible to accelerate the forming of a crosslinked resin. Further, in the combination of the crosslinkable resin having a carboxyl group and the curing agent (A) having an epoxy group, by further using the second curing agent (A) having an amino group or the second curing agent (A) having an acid anhydride group in combination, it is possible to accelerate the forming of the crosslinked resin. Namely, the reaction of the curing agent (A) with a crosslinkable resin contained in the anti-fogging agent composition is accelerated, whereby the crosslinking density of the crosslinked resin becomes high. Accordingly, it is possible to improve the abrasive resistance or the durability such as water resistance of the crosslinked resin, such being preferred.

Further, it is possible to use a second curing agent (A) as a component for adjusting the physical properties of the crosslinked resin rather than for crosslinking the crosslinkable component. For example, it is possible to increase the water absorption property of the crosslinked resin by the second curing agent (A). Further, the primary curing agent (A) also affects the function of the crosslinked resin, and in such an aspect, there are no substantial differences between the primary curing agent (A) and the second curing agent (A).

The curing agent (A) in the present invention may, for example, be a polyamine compound, a polycarboxylic acid compound (containing a polycarboxylic acid anhydride), a polyol compound, a polyisocyanate compound or a polyepoxy compound. Such a curing agent (A) is selected depending upon crosslinkable groups in the crosslinkable component. The curing agent (A) to be used for crosslinking a crosslinkable component having an epoxy group, a polyamine compound is preferred among the above compounds. Further, it is preferred to use the polyamine compound in combination with e.g. the polyol compound or the polycarboxylic acid anhydride as the second curing agent (A). The curing agent (A) to be used for crosslinking a crosslinkable resin having a carboxyl group is particularly preferably a polyepoxy compound. Further, it is also preferred to use the polyepoxy compound in combination with e.g. the polyamine or the polycarboxylic acid anhydride as the second curing agent (A).

The polyamine compound is preferably an aliphatic polyamine compound or an alicyclic polyamine compound. Specifically, ethylenediamine, triethylenetetramine, tetraethylenepentamine, hexamethylenediamine, isophoronediamine, mensenediamine, metaphenylenediamine, polyoxypropylenepolyamine, polyoxy glycol polyamine or 3,9-bis(3-aminopropyl)-2,4,8,10-tetraoxaspiro(5,5)undecane may, for example, be preferred.

As the polycarboxylic acid compound, oxalic acid, malonic acid, succinic acid, malic acid, citric acid, methyltetrahydrophthalic anhydride, hexahydrorophthalic anhydride or 4-methylhexahydrophthalic anhydride may, for example, be preferred.

As the polyol compound, a polyhydric alcohol-ethylene oxide adduct, a polyhydric alcohol-propylene oxide adduct or a polyester polyol may, for example, be preferred.

As the polyisocyanate compound, hexamethylene diisocyanate or isophorone diisocyanate may, for example, be preferred.

The polyepoxy compound is preferably an aliphatic polyglycidyl compound. As a specific example, ethylene glycol diglycidyl ether, polyethylene glycol polyglycidyl ether, propylene glycol diglycidyl ether, polypropylene glycol polyglycidyl ether, neopentyl glycol diglycidyl ether, glycerol polyglycidyl ether, diglycerol polyglycidyl ether, polyglycerol polyglycidyl ether, trimethylolpropane polyglycidyl ether, sorbitol polyglycidyl ether, pentaerythritol polyglycidyl ether or N,N,N',N'-tetraglycidyl-m-xylylenediamine may be mentioned. Among them, a polyglycidyl ether (one having the average number of glycidyl groups per molecule of more than two) of an aliphatic polyol having at least three hydroxyl groups, such as glycerol polyglycidyl ether, polyglycerol polyglycidyl ether or sorbitol polyglycidyl ether is preferred, since it is thereby possible to obtain a crosslinked resin especially excellent in the anti-fogging performance.

The combination of the crosslinking agent and a second crosslinking agent may be suitably selected depending upon e.g. the purpose of using the second crosslinking agent or the type of the crosslinkable resin or the crosslinking agent. For example, in a case where the second crosslinking agent is used for the purpose of accelerating forming of the crosslinked resin, and where the crosslinkable resin having a carboxyl group and the crosslinking agent having an epoxy group are used in combination, it is preferred to use a second crosslinking agent having an amino group or a second crosslinking agent having an acid anhydride group in combination. In such a case, the second crosslinking agent having an amino group is preferably at least one member selected from the group consisting of an aliphatic polyamine compound and an alicyclic polyamine compound, particularly preferably an alicyclic polyamine compound. Specifically, isophoronediamine is preferred. By such a combination, it is possible to accelerate forming of the crosslinked resin, and the abrasive resistance or water-wiping durability becomes good, such being preferred.

The proportion of the curing agent (A) to the crosslinkable component is usually a proportion in which the number of the crosslinkable groups and the number of the reactive groups are almost the same, and the equivalent ratio of the reactive group to the crosslinkable group is preferably approximately from 0.8 to 1.2. However, in a case where the second curing agent (A) or other reactive compounds (for example, a silane coupling agent with an amino group) coexist in such a crosslinking reaction system, the equivalent ratio of the reactive group including them to be reacted with each other, is usually from about 0.8 to 1.2. Further, in the case of a crosslinkable group or a reactive group which may be remained in the crosslinked resin, the proportion of such a reactive group to other reactive groups may be further increased.

Further, in a case where the second curing agent (A) is a compound having a reactive group to be reacted with a reactive group of the primary curing agent (A), it is preferred that the proportion of the second curing agent (A) to the primary curing agent (A) is a proportion so that the number of reactive groups in the primary curing agent (A)/the number of reactive groups in the second curing agent (A) would be from 5 to ⅕.

As mentioned above, it is possible to use the second curing agent (A) for adjusting physical properties of a crosslinked resin in addition to a function to cross-link a crosslinkable component. For example, by using an acid anhydride compound to be reacted with an amine compound as a curing agent, it is possible to bring a hydrophilic bond obtained by reacting an amino group with an acid anhydride group, into the crosslinked resin. Further, by using an amine to be reacted with an epoxy compound as a curing agent, it is possible to bring a hydrophilic bond obtained by reacting an epoxy group with an amino group reacted, into the crosslinked resin. In such a case, even when only one reactive group in the second curing agent (A) undergoes reaction, it is possible to develop the function. Further, a compound having one reactive group capable of bonding to the crosslinkable component or the curing agent (A) may be employed so long as it develops a function for adjusting physical properties of the crosslinked resin. Such a compound having one reactive group is a compound having no crosslinking functions.

Hereinafter, such a reactive compound having no crosslinking functions, which is used for the purpose of adjusting a function of the crosslinked resin, will be referred to as a modifier. In the case of using such a modifier in addition to the curing agent (A), such an amount is preferably at most an equivalent by mass, preferably from 0.01 to 0.5 time by mass to the curing agent (A). The modifier may be a monoamine, a monoisocyanate, a monocarboxylic acid, a monohydroxy compound or a monoepoxy compound.

The curing agent (B) is a material for accelerating the crosslinking reaction of a crosslinkable component, and it is possible to use a compound known usually as a polymerization catalyst. For example, a dicyanediimide, an organic acid dihydrazide, a tris(dimethylaminomethyl)phenol, a dimethylbenzylamine, a phosphine, an imidazole, an aryldiazonium salt or an arylsulfonium salt may be mentioned. Among them, a tris(dimethylaminomethyl)phenol, a phosphine or an arylsulfonium salt is preferred.

The amount of the curing agent (B) varies depending upon the type of the crosslinkable component, but in a case of using a polyepoxide as the crosslinkable component, it is preferably from 2 to 20 mass %, particularly preferably from 5 to 15 mass % to the polyepoxide. If the amount of the curing agent (B) is less than 2 mass %, it is likely that the reaction insufficiently proceeds, whereby the water absorbing performance and the durability can not sufficiently be attained. Further, if such an amount is large, it is likely that there is a problem in appearance such as yellowing of the crosslinked resin, since a residue of the curing agent (B) remains in the crosslinked resin obtainable. When the amount of the curing agent (B) is within the above range, there is no problem in appearance such as yellowing, and it is possible to develop good antifogging performance and durability.

The solvent is not particularly limited so long as it is a solvent excellent in solubility of the crosslinkable component or a component such as a curing agent, and further it is an inert solvent to such a component. As a specific example, an alcohol, an acetate, an ether, a ketone or water may be mentioned.

In the case of using a polyepoxide as the crosslinkable component, if a protic solvent is used as the solvent, there may be a case where a crosslinked resin is unlikely to be formed since the polyepoxide is reacted with the solvent depending upon the type thereof. Accordingly, in the case of using a protic solvent, it is preferred to select a solvent which is unlikely to be reacted with a polyepoxide. As the protic solvent, ethanol or isopropyl alcohol may be available. Other solvents are preferably at least one member selected from the group consisting of methyl ethyl ketone, n-butyl acetate, propylenecarbonate and diethylene glycol dimethyl ether.

Further, as the solvent, one type may be used alone, or two or more types may be used in combination. Further, there is a case where a crosslinkable component or a component such as a curing agent is used as a mixture with a solvent. In such a case, the solvent contained in the mixture may be used as a solvent for a coating composition and further, other solvents may be added thereto to be a coating composition.

In the present invention, by letting a coupling agent coexist at the time of reacting a crosslinkable component and a curing agent on the substrate surface, it is possible to improve the adhesion between the substrate surface and the crosslinked resin. Further, by preliminarily treating the substrate surface with a coupling agent (a coupling agent for treating a surface) as mentioned above, it is possible to similarly improve the adhesion between the substrate surface and the crosslinked resin. It is not essential to incorporate a coupling agent to a coating composition containing a curing agent and a crosslinkable component for forming a crosslinked resin. However, even in a case of using a substrate preliminarily treated with the coupling agent for treating a substrate, it is preferred that the coupling agent is present in a coating composition containing a crosslinkable component and a curing agent. When a coupling agent has a group reactive with a crosslinkable component or a curing agent, it is possible to use the coupling agent for the purpose of adjusting a function of the crosslinked resin in addition to improvement of the adhesion between the crosslinked resin and the substrate. Hereinafter, the coupling agent to be incorporated to a coating composition will be referred to simply as "a coupling agent".

The coupling agent is preferably an organic metal coupling agent or a polyfunctional organic compound.

The organic metal coupling agent may, for example, be a silane coupling agent, a titanium coupling agent or an aluminum coupling agent, and a silane coupling agent is preferred. It is preferred that such a coupling agent has a reactive group capable of reacting with a crosslinkable group in a crosslinkable component, a reactive group in a curing agent and a reactive group on the substrate surface. Here, it is preferred that the coupling agent is a compound having at least one bond (preferably one or two bonds) between a metal atom-carbon atom. When a silane coupling agent is taken as an example, it is preferred to use a compound having a silicon atom bonded to three hydrolyzable groups and one monovalent organic group (provided it is a group in which the terminal bonded to the silicon atom is a carbon atom); or a compound having a silicon atom bonded to two hydrolyzable groups and two monovalent organic groups (provided they are groups in which the terminal bonded to the silicon atom is a carbon atom). Further, the above monovalent organic group may be a hydrocarbon group such as an alkyl group or a group having a functional group, and at least one of such groups is preferably a group having a functional group (a group containing an epoxy group, a glycidoxy group, a methacryloyloxy group, an acryloyloxy group, an isocyanate group, an amino group, an ureido group, a mercapto group or the like).

The silane coupling agent may, for example, be 2-(3,4-epoxycyclohexyl)ethyltrimethoxysilane, 3-glycidoxypropyltrimethoxysilane, 3-glycidoxypropyltriethoxysilane, 3-glycidoxypropylmethyldiethoxysilane, 3-methacryloxypropylmethyldimethoxysilane, 3-methacryloxypropyltrimethoxysilane, 3-acryloxypropyltrimethoxysilane, 3-isocyanatepropyltrimethoxysilane, N-(2-aminoethyl)-3-aminopropylmethyldimethoxysilane, N-(2-aminoethyl)-3-aminopropyltrimethoxysilane, 3-aminopropyltrimethoxysilane, 3-aminopropylmethyldimethoxysilane, N-phenyl-3-aminopropyltrimethoxysilane, 3-ureidopropyltriethoxysilane or 3-mercaptopropyltrimethoxysilane.

Especially, it is preferred to use at least one member selected from the group consisting of 3-aminopropyltrimethoxysilane, 3-aminopropylmethyldimethoxysilane, N-(2-aminoethyl)-3-aminopropylmethyldimethoxysilane, N-(2-aminoethyl)-3-aminopropyltrimethoxysilane, 3-glycidoxypropyltrimethoxysilane, 3-glycidoxypropyltriethoxysilane, 3-glycidoxypropylmethyldiethoxysilane, 3-methacryloxypropylmethyldimethoxysilane, 3-methacryloxypropyltrimethoxysilane and 3-acryloxypropyltrimethoxysilane.

The polyfunctional organic compound means an organic compound having at least two functional groups, and has at least two reactive groups capable of reacting with a crosslinkable group in a crosslinkable component, a reactive group in a curing agent and a reactive group on the substrate surface. The reactive group may, for example, be a vinyl group, an epoxy group, a styryl group, an acryloyloxy group, a methacryloyloxy group, an amino group, an ureido group, a chloropropyl group, a mercapto group, a sulfide group, an isocyanate group, a hydroxyl group, a carboxyl group or an acid anhydride group. When the crosslinkable group in the crosslinkable component is an epoxy group, the reactive group in the coupling agent is preferably an isocyanate group, an amino group, an acid anhydride group, an epoxy group or a hydroxyl group, and particularly preferably at least one member selected from the group consisting of an isocyanate group and an epoxy group. As a specific example of the polyfunctional organic compound, polyisocyanate or polyepoxide may be mentioned.

When the coupling agent is a polyfunctional organic compound, there is no difference as a material between the coupling agent and the curing agent (A). However, there is a difference in the role between the coupling agent and the curing agent (A). Namely, the coupling agent plays a role to improve the adhesion between the substrate and the crosslinked resin, and the curing agent (A) plays a role to form a crosslinked resin by a reaction with a crosslinkable component.

The lower limit of the amount of the coupling agent to be used in the coating composition containing the crosslinkable component and the curing agent, is not limited since it is not an essential component. However, in order to exhibit an effect of incorporation of the coupling agent, the proportion of the coupling agent based on the total of the crosslinkable component, the curing agent and the coupling agent, is preferably at least 0.1 mass %, more preferably at least 0.5 mass %. The upper limit of the amount of the coupling agent to be used is restricted depending upon the physical properties or the function of the coupling agent. In the case of using the coupling agent for the purpose of improving the adhesion of the crosslinked resin, the proportion of the coupling agent based on the total of the crosslinkable component, the curing agent and the coupling agent is preferably at most 10 mass %, more preferably at most 5 mass %. In the case of adjusting physical properties such as water-absorption property of the crosslinked resin by the coupling agent or both of the curing agent and the coupling agent, a relatively large amount of the coupling agent is to be used. In such a case, the proportion of the coupling agent is preferably at most 15 mass %, more preferably at most 10 mass % based on the total of the crosslinkable component, the curing agent and the coupling agent. When the amount of the coupling agent to be used is excessive, there will be a case where the crosslinked resin is likely to be colored by e.g. oxidation at the time of exposing such a resin to high temperatures.

When a crosslinked resin layer is formed by using a liquid composition containing a crosslinkable component, a curing agent, a solvent and a coupling agent, such components may suitably be selected for use. For example, it is possible to employ the following combinations (the description of the solvent is omitted).

(1) a combination of a crosslinkable component having an epoxy group as a crosslinkable group, the curing agent (A) having an amino group and a coupling agent having an isocyanate group, an amino group or an epoxy group, (2) a combination of a crosslinkable component having an epoxy group as a crosslinkable group, the curing agent (A) having a carboxyl group or a hydroxyl group and a silane coupling agent having an isocyanate group or an amino group, (3) a combination of a crosslinkable component having an epoxy group as a crosslinkable group, the curing agent (B) and a coupling agent having an isocyanate group, an amino group or an epoxy group, (4) a combination of a crosslinkable component having a carboxyl group as a crosslinkable group, the curing agent (A) having an epoxy group and a coupling agent having an amino group or an epoxy group, or (5) a combination of a crosslinkable component having a carboxyl group as a crosslinkable group, the curing agent (A) having an amino group and a coupling agent having an isocyanate group or an epoxy group.

Further, "drying" in the present invention means that a solvent in the above liquid composition, which is applied on the substrate, is volatized for its removal. The drying condition is optionally set depending upon e.g. the type of the solvent contained in the liquid composition or the thickness of the coating film, and such drying may, for example, be carried out by maintaining the substrate coated with the above liquid composition at a temperature of from 20 to 100° C. for 1 minute to 20 hours (preferably from 1 minute to 1 hour).

Further, "reaction" means forming a crosslinked resin by a crosslinking reaction of a crosslinkable component contained in a composition. At that time, a reaction for forming a bond with the substrate surface may be involved, and it is preferred that the such a reaction for forming a bond with the substrate surface is involved, since the durability of the anti-fogging article would be good. "Reaction" may be carried out by maintaining a dried substrate at a temperature of from 80 to 200° C. for 1 minute to 1 hour. Further, the reaction may be also carried out by irradiation with ultraviolet ray or visible ray by using e.g. a metal halide lamp, a high-pressure mercury lamp or a halogen lamp. In such a case, the total amount of light is preferably from 10 to 1,000 mJ/cm$^2$.

Further, so long as it does not hinder the progress of the crosslinking reaction, "drying" and "reaction" may be continuously carried out under the same conditions.

A method for coating the substrate surface with a composition may, for example, be spin coating, dip coating, spray coating, flow coating or die coating, and spray coating, flow coating or die coating is preferred.

The composition layer obtainable by coating the substrate surface with a liquid composition has a thickness of preferably from 10 to 50 μm, and a thickness after drying of preferably from 5 to 40 μm. Further, the thickness of the crosslinked resin layer obtained after the reaction, is preferably from 5 to 30 μm, particularly preferably from 10 to 30 μm.

Further, when a glass substrate obtained by a float process is used as the substrate, the liquid composition may be applied on either its top surface (the surface which was not contacted with molten tin) or its bottom surface (the surface which was contacted with molten tin), and it is preferably applied on the bottom surface. When the anti-fogging film is formed on the bottom surface, there is an advantage that the abrasive resistance would be good.

The anti-fogging article of the present invention is employed so that the crosslinked resin layer is positioned at the interior side of a car or a room. Accordingly, there is a case where stains are attached on the surface of the anti-fogging article by contact with a person or a material. For example, in a vehicle such as an automobile, there is a case where stains such as sebum is attached on the surface of the crosslinked resin layer since occupants are likely to be in contact with the anti-fogging article. In such a case, it is possible to keep the surface of the anti-fogging article clean by wiping off the stains with a dry cloth.

Further, when occupants have a meal in a car, a beverage such as coffee or juice is likely to be spilled over and attached on the surface of the anti-fogging article. The anti-fogging article of the present invention employs a water-absorptive crosslinked resin, and therefore when a water-soluble liquid containing a colorant such as coffee or juice is attached on the surface, such a resin tends to absorb the colorant together with moisture, and the colorant tends to remain in the crosslinked resin layer as a stain, whereby the appearance will be impaired.

In order to prevent such staining, it is possible to improve the resistance to the staining without impairing the anti-fogging performance, by (i) forming a hydrophobic layer on the surface of the crosslinked resin layer, or (ii) mixing a hydrophobic material to a coating composition for obtaining the crosslinked resin layer, and forming a crosslinked resin by using the composition.

As a material for forming the hydrophobic layer in the method (i), it is possible to use a silicon compound having both a hydrophobic group and a hydrolyzable group. Specifically, a compound represented by the following formula (4) and a partial hydrolyzed condensate thereof are preferred.

$$F(CF_2)_m(CH_2)_nSi(X^1)_3 \qquad (4)$$

wherein m is an integer of from 1 to 10, n is an integer of from 2 to 4, $X^1$ is a halogen atom, an isocyanate group or an alkoxy group.

Specifically, the following compounds are preferred.

$$F(CF_2)_8(CH_2)_2Si(NCO)_3$$

$$F(CF_2)_8(CH_2)_2Si(OCH_3)_3$$

It is also possible to use such a compound in combination with a silicon compound such as tetraisocyanate silane having no hydrophobic groups so long as it does not affect the performance to prevent staining.

Further, it is also possible to use a silicon compound containing no fluorine atoms, such as $CH_3Si(NCO)_3$.

It is possible to form a layer of the hydrophobic material by applying a solution containing the above silicon compound on the surface of the crosslinked resin layer, followed by drying. Further, such a layer may be heated to from 200 to 300° C., as the case requires. The thickness of the layer of the hydrophobic material is preferably from 10 to 300 nm.

The hydrophobic material in the method (ii) is preferably a compound represented by the following formula (5).

$$(R^{11})_p\text{-M-}(OR^{12})_q \qquad (5)$$

wherein symbols in the formula have the following meanings.
$R^{11}$: a $C_{1-4}$ alkyl group,
M: a metal atom,
$R^{12}$: a hydrogen atom or a $C_{1-4}$ alkyl group,
p, q: each independently an integer of at least 1, and the total number of p and q is equivalent to the valence of the metal atom M.

$R^{11}$ is preferably a methyl group, an ethyl group, an n-propyl group or an n-butyl group. When $R^{12}$ is a $C_{1-4}$ alkyl group, a methyl group, an ethyl group, an n-propyl group, an isopropyl group or an n-butyl group is preferred. $R^{12}$ is preferably a methyl group or an ethyl group.

M may be a silicon atom, a titanium atom, a zirconium atom or an aluminum atom, and a silicon atom is preferred.

The compound represented by the formula (2) may, for example, be methyltrimethoxysilane, methyltriethoxysilane, methyltriisopropoxysilane, methyltributoxidesilane, ethyltrimethoxysilane, ethyltriethoxysilane, ethyltriisopropoxysilane, ethyltributoxidesilane, dimethyldimethoxysilane, dimethyldiethoxysilane, dimethyldiisopropoxysilane, dimethyldibutoxysilane, diethyldimethoxysilane, diethyldiethoxysilane, diethyldiisopropoxysilane, diethyldibutoxysilane or trimethylmethoxysilane. Among them, such a compound is preferably at least one member selected from the group consisting of methyltrimethoxysilane, dimethyldimethoxysilane and trimethylmethoxysilane.

Further, the compounds represented by the formula (2) may be used alone or in combination as a mixture of two or more of them.

The method (ii) is a particularly effective method when a polyepoxide is used as a crosslinkable component. In such a case, it is preferred that the hydrophobic material is added to a coating composition in an amount of from 0.2 to 10 mol % to the number of epoxy groups.

Since the anti-fogging article of the present invention is excellent in acid resistance or alkali resistance, it exhibits sufficient durability when contacted with e.g. an alkaline component such as a detergent or an acidic component contained in beverages drunk in an automobile.

Further, a water-absorptive crosslinked resin in an anti-fogging article is swollen at the time of absorbing moisture, and shrunk at the time of discharging moisture. Further, such a resin is exposed to a high temperature in summer season and exposed to a low temperature in winter season. Accordingly, there may be a case where the stress is exerted on a layer of the crosslinked resin, the adhesion between the crosslinked resin and the substrate is deteriorated, or the crosslinked resin is, for example, delaminated. In the anti-fogging article of the present invention, the adhesion between the crosslinked resin and the substrate is sufficiently good by nature, but in order to further improve the adhesion, it is preferred to form a thin film on the substrate surface as mentioned above. The thin film is preferably an organic group-containing metal oxide thin film.

It is possible to form the organic group-containing metal oxide thin film by treating the substrate surface with an organic metal coupling agent. As the organic metal coupling agent, a silane coupling agent, a titanium coupling agent or an aluminum coupling agent may, for example, be used, and a silane coupling agent is preferred. The silane coupling agent may, for example, be a silane coupling agent having a vinyl group, a silane coupling agent having an epoxy group, a silane coupling agent having a methacryloyloxy group, a silane coupling agent having an acryloyloxy group or a silane coupling agent having an amino group, and the silane coupling agent having an acryloyloxy group is preferred.

As a specific example, 2-(3,4-epoxycyclohexyl)ethyltrimethoxysilane, 3-glycidoxypropyltrimethoxysilane, 3-glycidoxypropyltriethoxysilane, 3-glycidoxypropylmethyldiethoxysilane, 3-methacryloxypropylmethyldimethoxysilane, 3-methacryloxypropyltrimethoxysilane, 3-acryloxypropyltrimethoxysilane, 3-isocyanatepropyltrimethoxysilane, N-(2-aminoethyl)-3-aminopropylmethyldimethoxysilane, N-(2-aminoethyl)-3-aminopropyltrimethoxysilane, 3-aminopropyltrimethoxysilane, 3-aminopropylmethyldimethoxysilane, N-phenyl-3-aminopropyltrimethoxysilane, 3-ureidopropyltriethoxysilane or 3-mercaptopropyltrimethoxysilane may be mentioned, and 3-acryloxypropyltrimethoxysilane is preferred.

The thickness of the organic group-containing metal oxide thin film is preferably from 5 to 50 nm, particularly preferably from 20 to 40 nm.

The present invention provides an anti-fogging agent composition for obtaining an anti-fogging article to satisfy conditions of the above saturated water absorption, glass transition point and water contact angle.

The anti-fogging agent composition is preferably (I) an anti-fogging agent composition characterized by comprising a polyepoxide, a curing agent and a solvent; or (II) an anti-fogging agent composition characterized by comprising a crosslinkable vinyl polymer containing monomer units (U1) of an unsaturated carboxylate monomer having a cationic group, monomer units (U2) of an unsaturated carboxylate monomer having a hydrocarbon group and monomer units (U3) of an unsaturated carboxylic acid monomer, a crosslinking agent and a solvent.

The polyepoxide, the curing agent and the solvent contained in the anti-fogging agent composition (I) may be the same as the above, and the preferred embodiment is also the same.

The content of the polyepoxide varies depending upon the type of the curing agent. In a case of using the curing agent (A) as the curing agent, the polyepoxide is preferably incorporated in an amount of from 40 to 80 mass %, particularly preferably from 50 to 70 mass %, based on the total of the polyepoxide, the curing agent (A) and the coupling agent. In a case of using the curing agent (B) as the curing agent, the polyepoxide is preferably incorporated in an amount of from 60 to 95 mass %, particularly preferably from 70 to 90 mass %, based on the total of the polyepoxide, the curing agent (B) and the coupling agent.

The amount of the curing agent varies depending upon the type thereof, but the curing agent (A) is preferably incorporated in an amount of from 10 to 40 mass %, particularly preferably from 20 to 30 mass %, based on the total of the crosslinkable component, the curing agent (A) and the coupling agent. The curing agent (B) is preferably incorporated in an amount of from 1 to 10 mass %, particularly preferably from 3 to 10 masse, based on the total of the crosslinkable component, the curing agent (B) and the coupling agent.

Further, the amount of the solvent is preferably from 1 to 5 times, particularly preferably from 2 to 5 times, based on the total of the polyepoxide, the curing agent and the coupling agent.

The crosslinkable vinyl polymer contained in the anti-fogging agent composition (II), the monomer units (U1), (U2) and (U3) contained in the polymer, the curing agent (the primary curing agent or the second curing agent) and the solvent may be the same as the above, and the preferred embodiment is also the same.

The proportion of the component contained in the anti-fogging agent composition (II) differs depending upon the molecular weight of each component, but usually, the preferred proportion is as follows. The crosslinkable vinyl polymer is preferably incorporated in an amount of from 2 to 20 mol % based on the total of the crosslinkable vinyl polymer, the curing agent and the coupling agent. The curing agent is preferably incorporated in an amount of from 10 to 90 mol % based on the total of the crosslinkable vinyl polymer, the curing agent and the coupling agent. The coupling agent is preferably incorporated in an amount of from 10 to 90 mol % based on the total of the crosslinkable vinyl polymer, the curing agent and the coupling agent.

When the above preferred proportion is represented by mass %, the following proportion is preferred. The crosslinkable vinyl polymer is preferably incorporated in an amount of from 20 to 60 mass %, particularly preferably from 30 to 50 mass %, based on the total of the crosslinkable vinyl polymer, the curing agent and the coupling agent. The curing agent is preferably incorporated in an amount of from 40 to 80 mass %, particularly preferably from 40 to 60 mass %, based on the total of the crosslinkable vinyl polymer, the curing agent and the coupling agent. The coupling agent is preferably incorporated in an amount of from 5 to 40 mass %, particularly preferably from 5 to 20 mass %, based on the total of the crosslinkable vinyl polymer, the curing agent and the coupling agent.

Further, the amount of the solvent is preferably from 0.5 to 9 times, particularly preferably from 2 to 5 times, based on the total amount of the crosslinkable vinyl polymer, the curing agent and the coupling agent.

The anti-fogging agent composition of the present invention preferably contains a silane coupling agent as mentioned above. By adding the silane coupling agent thereto, it is possible to increase the adhesion between the substrate surface and the water-absorptive crosslinked resin having anti-fogging performance, which is formed by using the composition. As the silane coupling agent, it is possible to use one which is the same as the above silane coupling agent, and a preferred embodiment is also the same.

The amount of the silane coupling agent is preferably from 0.1 to 10 mass %, particularly preferably from 0.5 to 5 mass %, based on the total of the crosslinkable component, the curing agent and the coupling agent. At the time of adjusting physical properties such as the water absorption property of the crosslinked resin by the coupling agent or both of the curing agent and the coupling agent, there is a case where a relatively large amount of the coupling agent is used. In such a case, the proportion of the coupling agent is preferably at most 15 mass %, more preferably at most 10 mass %, based on the total of the crosslinkable component, the curing agent and the coupling agent. If the amount of the coupling agent to be used is excessive, it is likely that there is a problem such that the crosslinked resin is readily colored by e.g. oxidation at the time of exposing the crosslinked resin at a high temperature.

It is preferred that the anti-fogging agent composition of the present invention further contains a modifier. By incorporating the modifier, it is possible to give the crosslinkable resin functions or characteristics which can not be given by the crosslinkable resin or the curing agent only, and further it is possible to improve the functions or characteristics of the crosslinked resin, which are not sufficiently improved by the crosslinkable resin or the curing agent only. The modifier is suitably selected by components such as the crosslinkable resin, the curing agent, etc. The modifier added to the anti-fogging agent composition of the present invention is preferably a monoamine or a monocarboxylic acid in a case where the crosslinkable resin is a resin having a carboxyl group and the curing agent is a crosslinking agent having an epoxy group.

It is preferred that the anti-fogging agent composition of the present invention further contains a filler. By incorporating the filler, it is possible to increase the mechanical strength and the heat resistance of the crosslinked resin formed by using the composition, and it is possible to lower the shrinkage on curing of the resin at the time of crosslinking reaction. The filler is preferably a filler made of a metal oxide. The metal oxide may, for example, be silica, alumina, titania or zirconia, and silica is preferred. Such a filler may, for example, be SNOWTEX IPA-ST (manufactured by Nissan Chemical Industries, Ltd.).

Further, in addition to the above filler, it is possible to also use a filler made of ITO (Indium Tin Oxide). Since ITO has infrared absorption properties, it is possible to impart thermal absorption properties to the crosslinked resin. Accordingly, when the filler made of ITO is used, it is also possible to expect an anti-fogging effect by thermal absorption in addition to the water absorption properties.

The filler is preferably a powder, and its average primary particle diameter is from 0.01 to 0.3 μm, and preferably from 0.1 to 0.1 μm. Further, the amount of the filler to be incorporated is preferably from 1 to 20 mass %, particularly preferably from 1 to 10 mass %, based on the total amount of the polyepoxide and the curing agent. If it is less than 1 mass %, the effect of lowering the shrinkage on curing of the crosslinked resin is likely to be deteriorated, and if it exceeds 20 mass %, it is impossible to sufficiently secure the spaces for water absorption, whereby the anti-fogging performance is likely to be lowered.

At the time of coating a substrate with the anti-fogging agent composition of the present invention, there is a case where the thickness of the coating film will be uneven due to the wettability of the anti-fogging agent composition. If the crosslinking reaction proceeds while the thickness of the coating film is uneven, thereby to form the crosslinkable resin, there is a case where the perspective distortion occurs to the anti-fogging article. In order to make the thickness of the coating film to be uniform, it is preferred to incorporate a leveling agent to the anti-fogging agent composition. The leveling agent may, for example, be a silicone leveling agent, a fluorine leveling agent or a surfactant, and the silicone leveling agent is preferred. The silicone leveling agent may, for example, be an amino-modified silicone, a carbonyl-modified silicone, an epoxy-modified silicone, a polyether-modified silicone or an alkoxy-modified silicone. Among them, it is preferably at least one member selected from the group consisting of the amino-modified silicone, the epoxy-modified silicone and the polyether-modified silicone.

In addition, from the viewpoint that it is possible to impart the hydrophilic nature to the anti-fogging agent composition, and improve the anti-fogging performance, a silicone leveling agent having an oxyalkylene chain such as an oxyethylene chain or an oxypropylene chain is also preferred. When the amount of the silicone leveling agent to be added to the anti-fogging agent composition, is from 0.02 to 1 masse, the wettability can be improved and the thickness of the coating film can be even. If the amount of the silicone leveling agent to be added is too large, there is a case where the coating film will be turbid, and therefore such an amount is preferably from 0.02 to 0.30 mass %, particularly preferably from 0.02 to 0.10 mass %.

The above surfactant may be any one of a nonionic surfactant, a cationic surfactant, a betaine surfactant and an anionic surfactant. When such a surfactant is a surfactant having an oxyalkylene chain such as an oxyethylene chain or an oxypropylene chain, it is possible to impart the hydrophilic nature to the anti-fogging agent composition and improve the anti-fogging performance.

Further, when the amount of the water absorption in the anti-fogging article exceeds a limit amount of the crosslinked resin, there is a case where it is preferred that a water film is formed rather than the fogging state occurs, depending upon the application (e.g. a case to be used for washstands). In such a case, by adding a surfactant to an anti-fogging agent composition, it is possible to obtain the anti-fogging article in which a water film is formed when the amount of the water absorption is saturated. It is preferred that the surfactant to be used for such a purpose has a reactive group. With the reactive group, the surfactant becomes a part of the structure of the crosslinked resin, whereby the effect is more increased.

In the anti-fogging article of the present invention, when the crosslinked resin formed on the substrate surface has a saturated water absorption of at least 45 mg/cm$^3$ (preferably at least 60 mg/cm$^3$), it is possible to obtain good anti-fogging performance. Further, when the crosslinked resin has a glass transition point of at least 50° C. and a saturated water absorption of at least 45 mg/cm$^3$ or said crosslinked resin has a water contact angle of its surface being at least 30° and a saturated water absorption of at least 45 mg/cm$^3$, it is possible to obtain good anti-fogging performance and excellent durability.

Further, in the anti-fogging article of the present invention, when the crosslinked resin formed on the substrate surface is a crosslinked resin obtainable by reacting polyepoxide with a curing agent; or a crosslinked resin formed by reacting a curing agent with a crosslinkable vinyl polymer containing monomer units (U1) of an unsaturated carboxylate monomer having a cationic group, monomer units (U2) of an unsaturated carboxylate monomer having a hydrocarbon group and monomer units (U3) of an unsaturated carboxylate monomer, it is possible to obtain good anti-fogging performance and further improve durability.

Further, when the crosslinked resin constituting the anti-fogging article of the present invention is a crosslinked resin satisfying conditions of the above saturated water absorption, glass transition point and water contact angle, and further obtainable by reacting the curing agent with the polyepoxide or the crosslinkable vinyl polymer, the anti-fogging performance will be better, and the durability will be further improved.

The anti-fogging article of the present invention may, for example, be a window glass for transportation equipments (such as automobiles, trains, ships or airplanes), a refrigerated showcase, a mirror for washstands, a bathroom mirror or an optical equipment. Since the anti-fogging agent composition of the present invention has good anti-fogging performance and further has excellent durability, it is useful for obtaining the above anti-fogging article.

EXAMPLES

Now, the present invention will be described in detail with reference to Examples, but it should be understood that the present invention is not limited to such specific Examples. Here, Examples 1 to 6 and 9 to 25 are Examples of the present invention, Examples 7 and 8 are Reference Examples, and Examples 26 and 27 are Comparative Examples.

Evaluation Items of an Anti-Fogging Article

Now, evaluation items of an anti-fogging article will be described.

1. Glass Transition Point

The measurement was carried out in accordance with JIS K7121. An anti-fogging agent composition was introduced to an aluminum-made sample holder and fired at 100° C. for 1 hour to obtain a sample. Such a sample was left to stand for 1 hour in an environment at a temperature of 20° C. under a relative humidity of 50%. Then, the sample holder was sealed with a dedicated aluminum-made cap. The measurement was carried out by a differential scanning calorimeter DSC-60 (manufactured by Shimadzu Corporation). The measurement starting temperature was set at room temperature and the heating rate was 10° C./min.

2. Film Thickness

An anti-fogging article was left to stand for one hour in an environment under a relative humidity of 50%, and then the film step height was measured by using a surface profilometer (tradename: DEKTAK3030, manufactured by ULVAC, Inc.).

3. Saturated Water Absorption

An anti-fogging article is left to stand for one hour in an environment at room temperature under a relative humidity of 50%, then the surface of a water-absorptive crosslinked resin layer is exposed to warm water vapor at 40° C., and immediately after fogging or distortion due to a water film occurs on the surface of the crosslinked resin layer, the moisture amount (A) in the entire anti-fogging article is measured by using a micro-moisture analyzer. Separately, the moisture amount (B) in a substrate itself on which no water-absorptive crosslinked resin layer is formed, is measured in the same manner, and the value (referred to as "water absorption" in the present invention) calculated by subtracting the moisture amount (B) from the moisture amount (A) was then divided by the volume of the crosslinked resin to obtain a saturated water absorption.

The moisture amount was measured by a micro-moisture analyzer (product number: FM-300, manufactured by Kett Electric Laboratory). The test sample was heated at 120° C., the moisture discharged from the sample was adsorbed by molecular sieves in the micro-moisture analyzer, and a weight change of the molecular sieves was regarded as a moisture amount. Here, the time when the weight change per minute becomes at most 0.02 mg, was regarded as an end point. Further, the saturated water absorption was evaluated by using an anti-fogging article (a coating area of the water-absorptive crosslinked resin layer: 33 cm$^2$) prepared by using a glass substrate of 3.3 cm×10 cm×2 mm in thickness.

4. Water Contact Angle

In Examples 9 to 14, the anti-fogging article was left to stand for one hour in an environment at room temperature under a relative humidity of 50%, and immediately after a 1 μL water droplet was dropped on the surface of the crosslinked resin layer, the water contact angle was measured.

In Examples 18 to 25, the anti-fogging article was left to stand for one hour in an environment at room temperature under a relative humidity of 50%, then a 1 μL water droplet was dropped on the surface of the crosslinked resin layer, and upon expiration of two minutes, the water contact angle was measured.

5. Anti-Fogging Performance

The surface of a crosslinkable resin layer of an anti-fogging article which was left to stand for one hour in an environment at room temperature under a relative humidity of 50%, was held above a warm water bath at 40° C. to measure the anti-fogging time (minute) until the fogging or the distortion due to a water film was observed. Further, in the case of usual glass, fogging was observed in from 0.01 to 0.08 minute.

6. Abrasive Resistance

The abrasive resistance was measured in accordance with JIS R3212 (the interior side of a car). The measurement was carried out by using an abrasion wheel CS-10F by Taber abrader 5130. The abrasion wheel was contacted with the surface of the crosslinked resin layer of an anti-fogging article, and rotated for 100 times at a certain load, whereby the haze change ΔH (%) was measured, and evaluation was carried out based on the following evaluation standards. A load was set to 4.90 N in Examples 1 to 6 and 9 to 14, and 5.00 N in Examples 18 to 25.

⊚: ΔH was at most 10%.

○: ΔH was more than 10% and at most 20%.

X: ΔH was more than 20%, and/or a crosslinked resin layer was delaminated.

7. Water Resistance

An anti-fogging article was left to stand for 150 hours in a constant temperature water tank at 40° C., and evaluated on the basis of the following evaluation standards.

⊚: No change was observed in appearance, and the anti-fogging time was at least two minutes.

○: No change was observed in appearance, and the anti-fogging time was at least one minute and less than two minutes.

Δ: A change was observed in appearance, and/or the anti-fogging time was less than one minute.

8. Heat Resistance

Measurement was carried out in accordance with JIS R3212 (laminated glass). An anti-fogging article was maintained in a boiling water for two hours, and then evaluated on the basis of the following evaluation standards.

⊚: No change was observed in appearance, and the anti-fogging time was at least two minutes.

○: No change was observed in appearance, and the anti-fogging time was at least one minute and less than two minutes.

Δ: A change was observed in appearance, and/or the anti-fogging time was less than one minute.

9. Humidity Resistance

An anti-fogging article was kept in a constant temperature and humidity tank for 500 hours under a relative humidity of 90% at 90° C., and then evaluated on the basis of the following evaluation standards.

⊚: No change was observed in appearance, and the anti-fogging time was at least two minutes.

○: No change was observed in appearance, and the anti-fogging time was at least one minute and less than two minutes.

Δ: A change was observed in appearance, and/or the anti-fogging time was less than one minute.

10. Water-Wiping Durability

A flannel fabric (cotton No. 300) having water (1 mL) impregnated therein, was reciprocated on the surface of the crosslinked resin of the anti-fogging article 5,000 times under a certain load, followed by evaluation on the basis of the following evaluation standards. The load was 5.00 N/4 cm$^2$ in Examples 1 to 6 and 9 to 14, and 4.90 N/4 cm$^2$ in Examples 18 to 25.

⊚: No change was observed in appearance, and the anti-fogging time was at least two minutes.

○: No change was observed in appearance, and the anti-fogging time was at least one minute and less than two minutes.

Δ: A change was observed in appearance, and/or the anti-fogging time was less than one minute.

11. Stain Resistance 11-1. In Examples 9 to 12 and 14, the evaluation was carried out by an evaluation method as shown below.

Hair dye (0.5 mL) was dropped on the surface of the crosslinked resin of an anti-fogging article, then the article was kept in a constant temperature tank at 60° C. for 24 hours, and the color difference from the color before stained was measured, followed by evaluation on the basis of the following evaluation standards.

⊚: ΔEab=less than 5

○: ΔEab=at least 5 and less than 15

X: ΔEab=at least 15

11-2. In Examples 15 to 17, the evaluation was carried out by an evaluation method as shown below.

Coffee (0.5 mL) having a normal temperature was dropped by a dropper on the surface forming a crosslinked resin of an anti-fogging article horizontally placed, and then the article was left to stand for 30 minutes at a normal temperature. Then, the coffee was wiped off with tissue papers, the anti-fogging article was cleaned with flowing water, and the appearance of the anti-fogging article was visually confirmed.

Evaluation was carried out by evaluation standards such that a case where no stain is observed, was identified by ○, and a case where a stain is observed, was identified by X.

Example 1

Example 1-1

Preparation of Anti-Fogging Agent Composition

To a glass container having a stirrer and a thermometer set therein, ethanol (manufactured by Junsei Chemical Co., Ltd.) (8.45 g), glycerol polyglycidyl ether (tradename: DENACOL EX-314, manufactured by Nagase ChemteX Corporation) (4.5 g) and isophoronediamine (manufactured by Tokyo Kasei Kogyo Co., Ltd.) (1.15 g) were charged, followed by stirring for 3 hours at 25° C. Then, N-(2-aminoethyl)-3-aminopropylmethyldimethoxysilane (product number: KBM602, manufactured by Shin-Etsu Chemical Co., Ltd.) (1.5 g) was added thereto, followed by stirring at 25° C. for one hour to obtain an anti-fogging agent composition 1. Further, the number of epoxy functional groups of DENACOL EX-314 is 2.3 on average.

Example 1-2

Preparation of Anti-Fogging Article

A clean glass substrate (100 mm×100 mm×2 mm) having the surface polish-washed with cerium oxide and dried, was coated with the anti-fogging agent composition 1 by spin coating, followed by firing at 100° C. for one hour to obtain an anti-fogging article 1 having a layer of a crosslinked resin 1 with a thickness of 20 μm.

The anti-fogging article 1 obtained was evaluated with respect to the above items. The results are shown in Table 1. The glass transition point of the crosslinked resin 1 was 99° C., and the saturated water absorption was 130.3 g/cm³. Further, as a result of the evaluation test, the anti-fogging article 1 had excellent anti-fogging performance, abrasive resistance, water resistance, heat resistance, humidity resistance and water-wiping durability.

Example 2

Example 2-1

Preparation of Anti-Fogging Agent Composition

To a glass container having a stirrer and a thermometer set therein, water (49 g) and N-(2-aminoethyl)-3-aminopropylmethyldimethoxysilane (KBM602) (1 g) were charged and stirred at 25° C. for 1 hour, and then ethanol (50 g) was added thereto to prepare a coating fluid A. Further, the anti-fogging agent composition 1 was also prepared in the same manner as in Example 1.

Example 2-2

Preparation of Anti-Fogging Article

A clean glass substrate polish-washed, was coated with the coating fluid A by spin coating, followed by firing at 100° C. for 5 minutes to prepare an undercoat with a thickness of 10 nm. Then, the anti-fogging agent composition 1 was applied on the undercoat by spin coating and then fired at 100° C. for one hour to obtain the anti-fogging article 2 having a layer of a crosslinked resin layer with a thickness of 20 μm.

The anti-fogging article 2 was evaluated in the same manner as in Example 1. The results are shown in Table 1.

The glass transition point of the crosslinked resin 2 was 95° C., and the saturated water absorption of the anti-fogging article 2 was 127.3 mg/cm³. Further, the anti-fogging article 2 had an excellent anti-fogging performance, abrasive resistance, water resistance, heat resistance, humidity resistance and water-wiping durability.

Example 3

An anti-fogging article 3 is obtained in the same manner as in Example 1 except that in the anti-fogging agent composition 1 in Example 1, no N-(2-aminoethyl)-3-aminopropylmethyldimethoxysilane (1.5 g) is added thereto, and a polyethyleneterephthalate film (thickness: 3 mm) which is subjected to an oxygen-plasma treatment is used instead of a clean glass substrate having the surface polish-washed with cerium oxide and dried.

A crosslinked resin with a thickness of 15 μm, which is formed in the anti-fogging article 3, has a glass transition temperature of at least 80° C., and the anti-fogging article 3 has a saturated water absorption of at least 60.6 mg/cm³. The anti-fogging article 3 has excellent anti-fogging performance, abrasive resistance, water resistance, heat resistance, humidity resistance and water-wiping durability.

Example 4

An anti-fogging article 4 is obtained in the same manner as in Example 1 except that in the anti-fogging agent composition 1 in Example 1, isophoronediamine (1.15 g) is replaced with 2-methylimidazole (product number: 2MZ, manufactured by Shikoku Corporation) (0.16 g).

A crosslinked resin with a thickness of 22 μm, which is formed in the anti-fogging article 4, has a glass transition temperature of 77° C., and the anti-fogging article 4 has a saturated water absorption of at least 75.8 mg/cm³. The anti-

Example 5

Example 5-1

Preparation of Anti-Fogging Agent Composition

To a glass container having a stirrer and a thermometer set therein, water (49 g), acetic acid (0.1 g) and 3-acryloxypropyltrimethoxysilane (product number: KBM5103, manufactured by Shin-Etsu Chemical Co., Ltd.) (1 g) were charged and stirred at 25° C. for 1 hour, and then ethanol (50 g) was added thereto to prepare a coating fluid B. Further, to another glass container having a stirrer and a thermometer set therein, glycerol polyglycidyl ether (tradename: DENACOL EX-314, manufactured by Nagase ChemteX Corporation) (4.5 g), ADEKA OPTOMER (cationic photopolymerization initiator, product number: SP-152, manufactured by ADEKA CORPORATION) (0.96 g) and 3-glycidoxypropyltrimethoxysilane (product number: KBM403, manufactured by Shin-Etsu Chemical Co., Ltd.) (3 g) were charged and then stirred at 25° C. for 10 minutes to obtain an anti-fogging agent composition 5.

Example 5-2

Preparation of Anti-Fogging Article

A clean glass substrate polish-washed, was coated with the coating fluid B by spin coating, followed by firing at 100° C. for 5 minutes to prepare an undercoat with a thickness of 10 nm. Then, the anti-fogging agent composition 5 was applied on the undercoat by spin coating and then irradiated with ultraviolet rays (wavelength: 200 to 500 nm) using a metal halide lamp. The total amount of light was 500 mJ/cm$^2$. Further, firing was carried out at 100° C. for one hour to obtain an anti-fogging article 5 having a crosslinked resin layer with a thickness of 13 μm.

A crosslinked resin formed in the anti-fogging article 5 has a glass transition point of 89° C., and a saturated water absorption of the anti-fogging article 5 was 151.5 mg/cm$^3$. Further, an evaluation test was carried out, and the anti-fogging article 5 had excellent anti-fogging performance, abrasive resistance, water resistance, heat resistance, humidity resistance and water-wiping durability.

Example 6

ORGANO SILICA SOL (product number: IPA-ST manufactured by Nissan Chemical Industries, Ltd.) (3.33 g) (5.28 mass % to the anti-fogging agent composition 1) was further added to the anti-fogging agent composition 1 in Example 1 to obtain an anti-fogging agent composition 6. By using such an anti-fogging agent composition 6, an anti-fogging article 6 having a crosslinked resin layer with a thickness of 15 μm was obtained in the same manner as in Example 1.

The crosslinked resin formed in the anti-fogging article 6 had a glass transition point of 108° C., and the anti-fogging article 6 had a saturated water absorption of 51.5 mg/cm$^3$. It had excellent anti-fogging performance, abrasive resistance, water resistance, heat resistance, humidity resistance and water-wiping durability.

Example 7

To a glass container having a stirrer and a thermometer set therein, methyl ethyl ketone (37.64 g) and polyglycerol polyglycidyl ether (tradename: DENACOL EX-512, manufactured by Nagase ChemteX Corporation) (43.48 g) were charged, followed by stirring for 5 minutes. Then, isophoronediamine (manufactured by Tokyo Kasei Kogyo Co., Ltd.) (9.62 g) was added thereto, and further stirred for one hour. Then, N-(2-aminoethyl)-3-aminopropylmethyldimethoxysilane (product number: KBM602, manufactured by Shin-Etsu Chemical Co., Ltd.) (12.55 g) was added thereto, followed by stirring for one hour.

Then, a polyoxyalkyleneamino modified dimethylpolysiloxane copolymer (product number: FZ-3789, manufactured by Nippon Unicar Company Limited) (1.68 g) and ORGANO SILICA SOL (product number: IPA-ST, manufactured by Nissan Chemical Industries, Ltd.) (8.36 g) were added thereto, followed by stirring for 20 minutes. Further, methyl ethyl ketone (56.67 g) was added thereto to obtain an anti-fogging agent composition. Here, the number of epoxy functional groups of DENACOL EX-512 is 3 on average.

A clean glass substrate polish-washed was coated with an anti-fogging agent composition 7 by flow coating, and then dried and fired to obtain an anti-fogging article 7 having a crosslinked resin layer with a thickness of 25 μm. The anti-fogging time of the anti-fogging article 7 was 1.3 minutes, and the article had excellent abrasive resistance, water resistance, heat resistance and water-wiping durability.

Example 8

To a glass container having a stirrer and a thermometer set therein, polyoxyalkylenetriamine (tradename: Jeffamine T403, manufactured by Mitsui Kagaku Fine Chemicals, Inc.) (15.98 g) and ORGANO SILICA SOL (product number: NBAC-ST, manufactured by Nissan Chemical Industries, Ltd.) (2.36 g) were charged, followed by stirring for 10 minutes. Then, methyl ethyl ketone (38.37 g) was added thereto, followed by stirring for one minute, and then glycerol polyglycidyl ether (tradename: DENACOL EX-313, manufactured by Nagase ChemteX Corporation) (16.27 g) and an aliphatic polyepoxide (tradename: DENACOL EX-1610, manufactured by Nagase ChemteX Corporation) (19.59 g) were added thereto, followed by stirring for one hour. Then, N-(2-aminoethyl)-3-aminopropylmethyldimethoxysilane (product number: KBM602, manufactured by Shin-Etsu Chemical Co., Ltd.) (7.36 g) was added thereto, followed by stirring for one hour. Then, a polyoxyalkyleneamino modified dimethylpolysiloxane copolymer (product number: FZ-3789, manufactured by Nippon Unicar Company Limited) (0.07 g) was added thereto, followed by stirring for 20 minutes to obtain an anti-fogging agent composition 8. Here, the number of epoxy functional groups of DENACOL EX-1610 is at least 2.

A clean glass substrate polish-washed was coated with the anti-fogging agent composition 8 by flow coating, followed by drying and firing to obtain an anti-fogging article 8 having a crosslinked resin layer with a thickness of 16 μm. The anti-fogging time of the anti-fogging article 8 was 1.9 minutes, and the article had excellent anti-fogging performance, abrasive resistance, water resistance, heat resistance and humidity resistance. The anti-fogging article 8 was subjected to an evaluation of the stain adsorption property was evaluated. The results are shown in Table 5.

Example 9

To a glass container having a stirrer and a thermometer set therein, polyoxyalkylenetriamine (tradename: Jeffamine T403, manufactured by Mitsui Kagaku Fine Chemicals, Inc.) (2.17 g), ORGANO SILICA SOL (product number: NBAC- ST, manufactured by Nissan Chemical Industries, Ltd.) (0.34 g) and ethanol (12.51 g) were charged, followed by stirring for 10 minutes. Then, glycerol polyglycidyl ether (tradename: DENACOL EX-313, manufactured by Nagase ChemteX Corporation) (0.88 g), aliphatic polyepoxide (tradename: DENACOL EX-1610, manufactured by Nagase ChemteX Corporation) (4.25 g) and a polyoxyalkylene epoxy modified dimethylpolysiloxane copolymer (tradename: X-22-4741, manufactured by Shin-Etsu Chemical Co., Ltd.) (0.10 g) were added, followed by stirring for 1 hour. Then, 3-aminopropyltrimethoxysilane (product number: KBM903, manufactured by Shin-Etsu Chemical Co., Ltd., (1.00 g) was added thereto, followed by stirring for 1 hour to obtain an anti-fogging agent composition 9.

A clean glass substrate polish-washed, was coated with the anti-fogging agent composition 9 by spin coating, followed by drying and firing to obtain an anti-fogging article 9 having a crosslinked resin layer with a thickness of 26 μm. The anti-fogging article 9 had excellent anti-fogging performance, abrasive resistance, adhesion and stain resistance.

Example 10

To a glass container having a stirrer and a thermometer set therein, water (49.4 g), acetic acid (0.5 g) and 3-acryloxypropyltrimethoxysilane (KBM5103) (0.1 g) were charged and stirred at 25° C. for 1 hour, and then ethanol (50 g) was added thereto to prepare a coating fluid C. Further, the anti-fogging agent composition 9 was also prepared in the same manner as in Example 9.

A clean glass substrate polish-washed was coated with the coating fluid C by spin coating, followed by firing at 100° C. for 5 minutes to prepare an undercoat with a thickness of 10 nm. Then, the anti-fogging agent composition 9 was applied on the undercoat by spin coating and fired at 100° C. for 1 hour to obtain an anti-fogging article 10 having a crosslinked resin layer with a thickness of 26 μm. The anti-fogging article 10 had excellent anti-fogging performance, abrasive resistance, adhesion and stain resistance.

Example 11

To a glass container having a stirrer and a thermometer set therein, water (49.4 g), acetic acid (0.5 g) and vinyltrimethoxysilane (KBM1003) (0.1 g) were charged and stirred at 25° C. for 1 hour, and then ethanol (50 g) was added thereto to prepare a coating fluid E. Further, the anti-fogging agent composition 9 was also prepared in the same manner as in Example 9.

A clean glass substrate polish-washed was coated with a coating fluid A by spin coating, followed by firing at 100° C. for 5 minutes to prepare an undercoat with a thickness of 10 nm. Then, the anti-fogging agent composition 9 was applied on the undercoat by spin coating and fired at 100° C. for one hour to obtain an anti-fogging article 11 having a crosslinked resin layer with a thickness of 27 μm. The anti-fogging article 11 had excellent anti-fogging performance, abrasive resistance and stain resistance.

Example 12

To a glass container having a stirrer and a thermometer set therein, polyoxyalkylenetriamine (tradename: Jeffamine T403, manufactured by Mitsui Kagaku Fine Chemicals, Inc.) (2.17 g), ORGANO SILICA SOL (product number: NBAC-ST, manufactured by Nissan Chemical Industries, Ltd.) (0.34 g) and ethanol (12.51 g) were charged, followed by stirring for 10 minutes. Then, methyltrimethoxysilane (5.00 g), glycerol polyglycidyl ether (tradename: DENACOL EX-313, manufactured by Nagase ChemteX Corporation) (0.88 g), an aliphatic polyepoxide (tradename: DENACOL EX-1610, manufactured by Nagase ChemteX Corporation) (4.25 g) and polyoxyalkylene epoxy modified dimethylpolysiloxane copolymer (product name: X-22-4741, manufactured by Shin-Etsu Chemical Co., Ltd.) (0.10 g) were added, followed by stirring for one hour.

Then, 3-aminopropyltrimethoxysilane (product number: KBM903, manufactured by Shin-Etsu Chemical Co., Ltd.) (1.00 g) was added thereto, followed by stirring for one hour to obtain an anti-fogging agent composition 12. The coating fluid C was prepared in the same manner as in Example 10.

A clean glass substrate polish-washed was coated with a coating fluid C by spin coating, followed by firing at 100° C. for 5 minutes to prepare an undercoat with a thickness of 10 nm. Then, the anti-fogging agent composition 12 was applied on the undercoat by spin coating and dried and fired to obtain an anti-fogging article 12 having a crosslinked resin layer with a thickness of 15 μm. The anti-fogging article 12 had excellent anti-fogging performance, abrasive resistance, adhesion and stain resistance.

Example 13

To a glass container having a stirrer and a thermometer set therein, ethanol (5.20 g), sorbitol polyglycidyl ether (tradename: DENACOL EX-614B, manufactured by Nagase ChemteX Corporation) (5.41 g) and isophoronediamine (1.15 g) were charged, followed by stirring at 25° C. for one hour. Then, N-(2-aminoethyl)-3-aminopropylmethyldimethoxysilane (KBM602) (3.5 g) was added thereto and stirred for 0.5 hour, and ethanol (3.9 g) was further added thereto, followed by stirring for 0.5 hour to obtain an anti-fogging agent composition 13.

A clean glass substrate polish-washed, was coated with the anti-fogging agent composition 13 by spin coating, followed by drying and firing to obtain an anti-fogging article 13 having a crosslinked resin layer with a thickness of 12 μm. The anti-fogging article 13 had excellent anti-fogging performance and abrasive resistance.

Example 14

To a glass container having a stirrer and a thermometer set therein, ethanol (9.10 g), polyglycerol polyglycidyl ether (tradename: DENACOL EX-521, manufactured by Nagase ChemteX Corporation) (5.72 g) and isophoronediamine (1.15 g) were charged, followed by stirring at 25° C. for one hour. Then, N-(2-aminoethyl)-3-aminopropylmethyldimethoxysilane (KBM602) (1.0 g) was added thereto, followed by stirring for one hour to obtain an anti-fogging agent composition 14.

A clean glass substrate polish-washed was coated with the anti-fogging agent composition 14 by spin coating, followed by drying and firing to obtain an anti-fogging article 14 having a crosslinked resin layer with a thickness of 16 μm. The anti-fogging article 14 had excellent anti-fogging performance and abrasive resistance.

Example 15

To a glass container having a stirrer and a thermometer set therein, ethanol (74.97 g) and boric acid (0.13 g) were charged and then stirred until boric acid was completely dissolved therein. Then, $F(CF_2)_8C_2H_4Si(OCH_3)_3$ (product number: KBM7803, manufactured by Shin-Etsu Chemical Co., Ltd.) (0.65 g) was added thereto and stirred for 30 minutes, then hydrochloric acid (35%) (17.06 g) was slowly dropwise added thereto, and further tetramethoxysilane (5.87 g) was slowly dropwise added thereto, followed by stirring for one hour in a state where the liquid temperature was kept at 23° C. Then, ethanol (888.12 g) was added thereto, followed by stirring for ten minutes to obtain a hydrophobic composition 1.

On the surface of a crosslinked resin of the anti-fogging article 8 obtained in Example 8, the hydrophobic composition 1 was sprayed with a handy spray (product No: W-101, manufactured by ANEST IWATA Corporation) and dried for 10 minutes at a normal temperature to obtain an anti-fogging article 15 having a hydrophobic film. The anti-fogging article 15 was subjected to an evaluation of the stain adsorption property. The results are shown in Table 5. Further, the anti-fogging article 15 shows good anti-fogging performance even when it had a hydrophobic layer, and no deterioration of the anti-fogging performance was observed.

Example 16

To a glass container having a stirrer and a thermometer set therein, n-butyl acetate (99.00 g) and $F(CF_2)_8C_2H_4Si(NCO)_3$ (product number: MIF-800, manufactured by Matsumoto Pharmaceutical Manufacture Co., Ltd.) (1.00 g) were charged, followed by stirring at a normal temperature for 10 minutes to obtain a hydrophobic composition 2.

The surface of the glass substrate was coated with the anti-fogging agent composition 8 obtained in Example 8 by flow coating, the hydrophobic composition 2 was sprayed on the coated film with a handy spray (product No: W-101, manufactured by ANEST IWATA Corporation), followed by drying and firing to obtain an anti-fogging article 16. The anti-fogging article 16 was subjected to an evaluation of the stain adsorption property in the same manner as in Example 15. The results are shown in Table 5. Further, the anti-fogging article 16 showed good anti-fogging performance even when it had a hydrophobic layer, and no deterioration of the anti-fogging performance was observed.

Example 17

To a glass container having a stirrer and a thermometer set therein, ethanol (95.00 g) and a hydrolyzate of $F(CF_2)_8C_2H_4Si(OCH_3)_3$ (5.00 g) were charged, followed by stirring at a normal temperature for 10 minutes to obtain a hydrophobic composition 3.

A small amount of the hydrophobic composition 3 was impregnated in BEMCOT®, and applied on the anti-fogging article 8 obtained in the same manner as in Example 8 so as not to form spots, followed by drying at a normal temperature for 10 minutes. Then, an excess hydrophobic composition 3 was wiped off with a dried BEMCOT® to obtain an anti-fogging article 17. The anti-fogging article 17 was subjected to an evaluation of the stain adsorption property in the same manner as in Example 15. The results are shown in Table 5. Further, the anti-fogging article 17 showed good anti-fogging performance even if it had a hydrophobic layer, and no deterioration of the anti-fogging performance was observed.

Example 18

Example 18-1

Preparation of Anti-Fogging Agent Composition

To a glass container having a stirrer and a thermometer set therein, a mixture (tradename: JURYMER SPO-601, manufactured by Nihonjunyaku Co., Ltd.) (9.0 g) of a crosslinkable vinyl polymer and a solvent, glycerol polyglycidyl ether (tradename: DENACOL EX-314, manufactured by Nagase ChemteX Corporation) (2.7 g) having the number of epoxy groups of 2.3 on average and isophoronediamine (manufactured by Tokyo Kasei Kogyo Co., Ltd.) (0.69 g) were charged, followed by stirring at 25° C. for one hour. Then, N-(2-aminoethyl)-3-aminopropylmethyldimethoxysilane (tradename: KBM602, manufactured by Shin-Etsu Chemical Co., Ltd.) (0.5 g), tetraethyl silicate (manufactured by Junsei Chemical Co., Ltd.) (0.1 g) and ethanol (manufactured by Junsei Chemical Co., Ltd.) (5.2 g) were added thereto, followed by stirring at 25° C. for one hour to obtain an anti-fogging agent composition 18. It is considered that JURYMER SPO-601 is obtainable by thermal polymerization of ethyltrimethylammonium chloride methacrylate, methoxyethylacrylate, methylmethacrylate and acrylic acid in the solvent.

Example 18-2

Preparation of Anti-Fogging Article

A clean glass substrate (100 mm×100 mm×2 mm) having the surface polish-washed with cerium oxide and dried, was coated with the anti-fogging agent composition 1 by spin coating, followed by firing at 100° C. for one hour to obtain an anti-fogging article 18 having a crosslinked resin layer with a thickness of 20 μm.

The anti-fogging article 18 obtained was subjected to the evaluation with respect to the following items. The results are shown in Table 3. The anti-fogging article had a water contact angle of 450 and a saturated water absorption of 99.4 mg/cm$^3$. Further, as a result of the evaluation test, the anti-fogging article 18 was excellent in anti-fogging performance, abrasive resistance, water resistance, heat resistance, humidity resistance and water-wiping durability.

Example 19

Example 19-1

Preparation of Anti-Fogging Agent Composition

To a glass container having a stirrer and a thermometer set therein, water (49 g) and N-(2-aminoethyl)-3-aminopropyl-methyldimethoxysilane (KBM602) (1 g) were charged and stirred at 25° C. for one hour, and then ethanol (50 g) was added thereto to prepare the coating fluid B. Further, the anti-fogging agent composition 18 was prepared in the same manner as in Example 18.

Example 19-2

Preparation of Anti-Fogging Article

A clean glass substrate polish-washed was coated with the coating fluid B by spin coating, followed by firing at 100° C. for five minutes to prepare an undercoat with a thickness of 10 nm. Then, the anti-fogging agent composition 18 was applied on the undercoat by spin coating and fired at 100° C. for one hour to obtain an anti-fogging article 19 having a crosslinked resin layer with a thickness of 20 μm.

The anti-fogging article 19 was evaluated in the same manner as in Example 18. The results are shown in Table 3. The anti-fogging article 19 obtained had a water contact angle of 44° and a saturated water absorption of 95.8 mg/cm$^3$. It had excellent anti-fogging performance, abrasive resistance, water resistance, heat resistance, humidity resistance and water-wiping durability.

Example 20

To the anti-fogging agent composition 18 in Example 18, a polyoxyalkyleneamino modified dimethylpolysiloxane copolymer (product number: FZ-3789, manufactured by Nippon Unicar Company Limited) (0.03 g) (0.08 mass % to the anti-fogging agent composition) and ethanol (18 g) were further added to obtain an anti-fogging agent composition 20. By using such an anti-fogging agent composition 20, an anti-fogging article 20 was obtained in the same manner as in Example 18.

The obtained anti-fogging article 20 having a crosslinked resin layer with a thickness of 21 μm, had a water contact angle of 41° and a saturated water absorption of 106.7 mg/cm$^3$, and was excellent in anti-fogging performance, abrasive resistance, water resistance, heat resistance, humidity resistance and water-wiping durability.

Example 21

An anti-fogging article 21 was prepared in the same manner as in Example 18 except that N-(2-aminoethyl)-3-aminopropylmethyldimethoxysilane (0.5 g) and tetraethyl silicate (0.1 g) contained in the anti-fogging agent composition 1 in Example 18 were changed to tetraisocyanatesilane (product number: SI-400, manufactured by Matsumoto Pharmaceutical Manufacture Co., Ltd.) (0.1 g) to obtain an anti-fogging agent composition 21.

The obtained anti-fogging article 21 having a crosslinked resin layer with a thickness of 30 μm, had a water contact angle of 32° and a saturated water absorption of 124.8 mg/cm$^3$. Though the anti-fogging performance was excellent, ΔH was at least 20% in the abrasive resistance, and delamination was confirmed in the water resistance, heat resistance, humidity resistance and water-wiping durability.

Example 22

An anti-fogging article 22 was prepared in the same manner as in Example 18 except that isophoronediamine (0.69 g) contained in the anti-fogging agent composition 1 in Example 18 was changed to N,N,N',N'-tetraglycidyl-m-xylylenediamine (tradename: TETRAD-X, manufactured by Mitsubishi Gas Chemical Company, Inc.) (0.67 g) to obtain an anti-fogging agent article 22. The obtained anti-fogging article 22 having a crosslinked resin layer with a thickness of 12 μm had a water contact angle of 52° and a saturated water absorption of 56.7 mg/cm$^3$. Though the anti-fogging article 22 was excellent in anti-fogging performance and also excellent in water resistance, heat resistance and humidity resistance, ΔH was at least 20% in the abrasive resistance, and scratches were confirmed in the water-wiping durability.

Example 23

An anti-fogging agent composition 23 was prepared in the same manner as in Example 18 except that no N-(2-aminoethyl)-3-aminopropylmethyldimethoxysilane (0.5 g) was added to obtain an anti-fogging article 23.

The obtained anti-fogging article having a crosslinked resin layer with a thickness of 15 μm had a water contact angle of 35° and a saturated water absorption of 136.1 mg/cm$^3$. Though the anti-fogging article 23 was excellent in anti-fogging performance, ΔH was at least 20% in the abrasive resistance, delamination was confirmed in the heat resistance, and scratches were confirmed in the water-wiping durability.

Example 24

An anti-fogging agent composition 24 was prepared in the same manner as in Example 18 except that no isophoronediamine (0.69 g) was added thereto to obtain an anti-fogging article 24. The obtained anti-fogging article 24 having a crosslinked resin layer with a thickness of 19 μm had a water contact angle of 47° and a saturated water absorption of 49.1 mg/cm$^3$. Though the anti-fogging article 24 was excellent in the anti-fogging property and also excellent in water resistance, heat resistance and humidity resistance, ΔH was at least 20% in the abrasive resistance, and scratches were confirmed in the water-wiping durability.

Example 25

An anti-fogging agent composition 25 was prepared in the same manner as in Example 18 except that no tetraethyl silicate (0.1 g) was added to obtain an anti-fogging article 25. The obtained anti-fogging article 25 having a crosslinked resin layer with a thickness of 21 μm had a water contact angle of 50° and a saturated water absorption of 98.5 mg/cm$^3$. The anti-fogging article 25 was excellent in the anti-fogging property, abrasive resistance, water resistance, heat resistance, humidity resistance and water-wiping durability.

Example 26

In accordance with JP-A-2002-161241, a composition 26 for coating an anti-fogging surface was obtained by the following procedure. When the present inventors conducted experiments as disclosed in JP-A-2002-161241, solidification was observed during preparing the composition, and therefore the amount of methanol or toluene to be used was decreased and the stirring time after addition of methanol and water for hydrolysis was shortened. Further, since an anti-fogging film was not sufficiently formed under the conditions as disclosed in JP-A-2002-161241, the curing condition was changed.

To a flask equipped with a stirrer, a thermometer and a condenser, methanol (100 g), toluene (20 g) and 3-aminopropyltrimethoxysilane (50 g) were charged and heated to 65° C. in a nitrogen atmosphere. Then, a mixed solution of bisphenol A diglycidyl ether (10 g) and toluene (10 g) was added thereto, followed by stirring at 65° C. for three hours in the atmosphere. Then, the interior was cooled to room temperature, and a mixed solution of methanol (20 g) and water (10 g) for hydrolysis of an alkoxysilyl group was added thereto, followed by stirring at room temperature for 20 minutes to obtain an anti-fogging surface-coating composition 26.

A clean glass substrate polish-washed was coated with the anti-fogging surface-coating composition 26 by spin coating and was kept at 110° C. for one hour to obtain an anti-fogging article 26 having an anti-fogging film with a thickness of 10 μm. And the glass transition point, saturated water absorption, anti-fogging performance, abrasive resistance, water resistance, water contact angle and water-wiping property were evaluated. The results are shown in Table 4.

Example 27

In accordance with JP-A-2002-161241, an anti-fogging surface-coating composition 27 was obtained, but the amount of the solvent to be used was reduced in the same manner as in Example 26, and the curing condition was changed.

To a flask equipped with a stirrer, a thermometer and a condenser, ethanol (30 g), polyethyleneimine (tradename: EPOMIN SP-018, manufactured by Nippon Shokubai Co., Ltd.) (15 g) and 3-glycidoxypropyltrimethoxysilane (12 g) were charged, followed by stirring at 65° C. for three hours in the atmosphere. Then, the interior was cooled to room temperature, a mixed solution of ethanol (45 g) and water (6 g) for hydrolysis of an alkoxysilyl group was added thereto, followed by stirring at room temperature for one hour to obtain an anti-fogging surface-coating composition 27.

A clean glass substrate polish-washed was coated with an anti-fogging surface-coating composition 27 by spin coating and was kept at 110° C. for one hour to obtain an anti-fogging article 27 having an anti-fogging film with a thickness of 15 μm. And the glass transition point, saturated water absorption, water contact angle, anti-fogging performance, abrasive resistance, water resistance and water-wiping durability were evaluated. The results are shown in Table 4.

TABLE 4

|  | Ex. 26 | Ex. 27 |
|---|---|---|
| Film thickness (μm) | 10 | 15 |
| Glass transition point (° C.) | 40 | 28 |
| Water absorption (mg) | 7.42 | 7.01 |
| Saturated water absorption (mg/cm$^3$) | 0 | 37.2 |
| Water contact angle (°) | 66 | 17 |
| Anti-fogging performance (min) | 3 | 42 |
| Abrasive resistance | ◎ | ○ |
| Water resistance | No substantial change was observed in appearance, but no anti-fogging performance was obtained | Delaminated |
| Water-wiping durability | No substantial change was observed in appearance, but no anti-fogging performance was obtained | Delaminated |

TABLE 1

|  | Ex. 1 | Ex. 2 | Ex. 3 | Ex. 4 | Ex. 5 | Ex. 6 |
|---|---|---|---|---|---|---|
| Film thickness (μm) | 20 | 20 | 15 | 22 | 13 | 15 |
| Glass transition point (° C.) | 99 | 95 | >80 | 77 | 89 | 108 |
| Water contact angle (°) | 78 | 78 | 60 | 52 | 49 | 75 |
| Water absorption (mg) | 8.6 | 8.4 | >2 | 5.5 | 6.5 | 2.55 |
| Saturated water absorption (mg/cm$^3$) | 130.3 | 127.3 | >60.6 | 75.8 | 151.5 | 51.5 |
| Anti-fogging performance (min) | 2.2 | 2.3 | 1.2 | 1.5 | 2.5 | 1.8 |
| Abrasive resistance | ◎ | ◎ | ○ | ○ | ◎ | ◎ |
| Water resistance | ◎ | ◎ | ○ | Δ | ○ | ○ |
| Heat resistance | ◎ | ◎ | ○ | Δ | ○ | ○ |
| Humidity resistance | ○ | ○ | ○ | ○ | ○ | ◎ |
| Water-wiping durability | ◎ | ◎ | ○ | ○ | ○ | ○ |

TABLE 2

|  | Ex. 9 | Ex. 10 | Ex. 11 | Ex. 12 | Ex. 13 | Ex. 14 |
|---|---|---|---|---|---|---|
| Film thickness (μm) | 26 | 26 | 27 | 15 | 12 | 16 |
| Glass transition point (° C.) | 95 | 95 | 95 | 100 | 86 | 92 |
| Water absorption (mg) | 7.42 | 7.01 | 6.28 | 3.43 | 1.84 | 2.55 |
| Saturated water absorption (mg/cm$^3$) | 85.6 | 80.9 | 69.8 | 68.6 | 46.0 | 47.8 |
| Water contact angle (°) | 61 | 72 | 61 | 92 | 62 | 75 |
| Anti-fogging performance (min) | 2.2 | 2.0 | 2.1 | 0.9 | 0.9 | 0.5 |
| Abrasive resistance | ◎ | ◎ | ◎ | ○ | ◎ | ◎ |
| Stain resistance | ○ | ○ | ○ | ◎ | — | ◎ |

TABLE 3

|  | Ex. 18 | Ex. 19 | Ex. 20 | Ex. 21 | Ex. 22 | Ex. 23 | Ex. 24 | Ex. 25 |
|---|---|---|---|---|---|---|---|---|
| Film thickness (μm) | 20 | 20 | 21 | 30 | 12 | 15 | 19 | 21 |
| Water contact angle (°) | 45 | 44 | 41 | 32 | 52 | 35 | 47 | 50 |
| Water absorption (mg) | 6.56 | 6.32 | 7.39 | 12.36 | 2.24 | 6.74 | 3.08 | 7.06 |
| Saturated water absorption (mg/cm$^3$) | 99.4 | 95.8 | 106.7 | 124.8 | 56.7 | 136.1 | 49.1 | 98.5 |
| Anti-fogging performance (min) | 3.0 | 2.9 | 3.5 | 6.2 | 0.5 | 4.1 | 0.9 | 1.9 |
| Abrasive resistance | ○ | ○ | ○ | × | × | × | × | ○ |
| Water resistance | ○ | ○ | ○ | × | ○ | Δ | ○ | ○ |
| Heat resistance | ○ | ○ | ○ | × | ○ | × | ○ | ○ |
| Humidity resistance | ○ | ○ | ○ | × | ○ | Δ | ○ | ○ |
| Water-wiping durability | ○ | ○ | ○ | × | × | × | × | ○ |

TABLE 5

|  | Ex. 8 | Ex. 15 | Ex. 16 | Ex. 17 |
|---|---|---|---|---|
| Stain resistance | Brown stain was deposited × | No stain ○ | No stain ○ | No stain ○ |

INDUSTRIAL APPLICABILITY

The anti-fogging article of the present invention has an excellent anti-fogging performance and also has durability, whereby such an article is useful for a window for transport equipments (for example, automobiles, trains, ships or airplanes), a refrigerated showcase, a mirror for washstands, a bathroom mirror or an optical equipment. Further, the anti-fogging agent composition of the present invention is useful for preparing such an anti-fogging article.

The entire disclosures of Japanese Patent Application No. 2005-318347 filed on Nov. 1, 2005 and Japanese Patent Application No. 2006-032573 filed on Feb. 9, 2006 including specifications, claims, drawings and summaries are incorporated herein by reference in their entireties.

What is claimed is:

1. An anti-fogging article comprising a substrate and a water-absorptive crosslinked resin layer formed on the surface of the substrate, wherein the water-absorptive crosslinked resin is a crosslinked resin with a saturated water absorption of at least 45 mg/cm$^3$, and which water-absorptive crosslinked resin is a resin obtainable by reacting a polyglycidyl ether compound, a curing agent and a coupling agent,
    wherein the polyglycidyl ether compound is at least one member selected from the group consisting of glycerol polyglycidyl ether, diglycerol polyglycidyl ether, polyglycerol polyglycidyl ethers and sorbitol polyglycidyl ether, and
    wherein the curing agent is curing agent (A) or curing agent (B),
    when the curing agent is curing agent (A), which is a compound having at least two reactive groups capable of reacting with an epoxy group in the polyglycidyl ether compound, the polyglycidyl ether compound is present in an amount of from 40 to 80 mass % based on the total of the polyglycidyl ether compound, the curing agent and the coupling agent, and
    when the curing agent is curing agent (B), which is a compound to accelerate formation of the crosslinked resin by catalyzing a crosslinking reaction of the polyglycidyl ether compound, the polyglycidyl ether compound is present in an amount of from 60 to 95 mass % based on the total of the polyglycidyl ether compound, the curing agent and the coupling agent,
    wherein the water-absorptive crosslinked resin layer has a thickness of from 5 to 30 μm, and
    wherein the substrate comprises glass.

2. The anti-fogging article according to claim 1, wherein the curing agent is curing agent (A), and curing agent (A) is at least one member selected from the group consisting of a polyol compound and a polycarboxylic acid anhydride.

3. The anti-fogging article according to claim 1, wherein curing agent (A) is present and is a polyamine compound.

4. The anti-fogging article according to claim 3, wherein the polyamine compound is ethylenediamine, triethylenetetramine, tetraethylenepentamine, hexamethylenediamine, isophoronediamine, mensenediamine, metaphenylenediamine, polyoxypropylenepolyamine, polyoxy glycol polyamine or 3,9-bis(3-aminopropyl)-2,4,8,10-tetraoxaspiro (5,5)undecane.

5. The anti-fogging article according to claim 1, wherein the curing agent is curing agent (B) and curing agent (B) is a dicyanediimide, an organic acid dihydrazide, a tris(dimethylaminomethyl)phenol, a dimethylbenzylamine, a phosphine, an imidazole, an aryldiazonium salt or an arylsulfonium salt.

6. The anti-fogging article according to claim 5, wherein curing agent (B) is a tris(dimethylaminomethyl)phenol, a phosphine or an arylsulfonium salt.

7. The anti-fogging article according to claim 1, wherein the water-absorptive crosslinked resin has a water contact angle of its surface of at least 30°.

8. The anti-fogging article according to claim 1, wherein the water-absorptive crosslinked resin has a glass transition point of at least 50° C. as measured by a differential scanning calorimeter.

9. The anti-fogging article according to claim 1, wherein the water-absorptive crosslinked resin has a water contact angle of its surface of at least 30° and a saturated water absorption of at least 60 mg/cm$^3$.

10. The anti-fogging article according to claim 1, wherein the water-absorptive crosslinked resin layer is a resin layer formed by applying a liquid composition comprising a polyglycidyl ether compound, a curing agent and a solvent on the surface of the substrate, followed by drying and reacting.

11. The anti-fogging article according to claim 1, which further comprises a hydrophobic layer on the surface of the crosslinked resin layer.

12. The anti-fogging article according to claim 1, wherein the saturated water absorption is at least 60 mg/cm$^3$.

13. The anti-fogging article according to claim 1, wherein the saturated water absorption is from 75 to 185 mg/cm$^3$.

14. The anti-fogging article according to claim 1, wherein the saturated water absorption is from 90 to 155 mg/cm$^3$.

15. The anti-fogging article according to claim 1, wherein the crosslinked resin has a glass transition point is at least 90° C.

16. The anti-fogging article according to claim 1, wherein the crosslinked resin has a glass transition point ranges from 50° C. to 200° C.

* * * * *